(12) United States Patent
Harsila et al.

(10) Patent No.: US 11,635,291 B2
(45) Date of Patent: Apr. 25, 2023

(54) WORKPIECE HOLDER FOR UTILIZATION IN METROLOGY SYSTEM FOR MEASURING WORKPIECE IN DIFFERENT ORIENTATIONS

(71) Applicant: Mitutoyo Corporation, Kanagawa-ken (JP)

(72) Inventors: Scott Allen Harsila, Shoreline, WA (US); Maxwell James Perkins, Mountlake Terrace, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 84 days.

(21) Appl. No.: 17/246,531

(22) Filed: Apr. 30, 2021

(65) Prior Publication Data
US 2022/0349705 A1 Nov. 3, 2022

(51) Int. Cl.
| | |
|---|---|
| *G01B 11/00* | (2006.01) |
| *G01B 11/24* | (2006.01) |
| *G01N 21/95* | (2006.01) |
| *G01M 11/02* | (2006.01) |

(52) U.S. Cl.
CPC ........... *G01B 11/005* (2013.01); *G01B 11/24* (2013.01); *G01M 11/025* (2013.01); *G01N 21/9506* (2013.01); *G01N 2021/9511* (2013.01)

(58) Field of Classification Search
CPC .............. G01B 11/24; G01N 21/9506; G01N 2021/9511; G01M 11/025
See application file for complete search history.

(56) References Cited

U.S. PATENT DOCUMENTS

| | | | |
|---|---|---|---|
| 4,357,006 A | 11/1982 | Hayes | |
| 4,908,951 A | 3/1990 | Gurny | |
| 5,129,724 A | 7/1992 | Brophy et al. | |
| 5,198,877 A | 3/1993 | Schulz | |
| 5,825,666 A | 10/1998 | Freifield | |
| 5,847,819 A | 12/1998 | Yanagi | |
| 5,973,772 A | 10/1999 | Fukuma et al. | |
| 6,067,165 A | 5/2000 | Matsumiya et al. | |

(Continued)

FOREIGN PATENT DOCUMENTS

EP  2 266 754 A1  12/2010

*Primary Examiner* — Rebecca C Bryant
(74) *Attorney, Agent, or Firm* — Seed IP Law Group LLP

(57) ABSTRACT

A workpiece holder is configured to hold a workpiece and is utilized in a metrology system which includes a sensing configuration for obtaining 3-dimensional surface data for the workpiece. The workpiece holder includes at least three reference features (e.g., spherical reference features extending from sides) that are configured to be sensed by the sensing configuration when the workpiece holder is in different orientations (e.g., as rotated 180 degrees between first and second orientations for presenting front and back sides of the workpiece towards the sensing configuration). A determination of 3-dimensional positions of the reference features for each orientation enables a combining (e.g., in a common coordinate system) of 3-dimensional surface data that is acquired for the workpiece in each orientation. Interchangeable workpiece holding portions may be provided that fit within the workpiece holder for holding workpieces with different characteristics (e.g., having different sizes and/or shapes).

24 Claims, 12 Drawing Sheets

(56) References Cited

U.S. PATENT DOCUMENTS

| | | | |
|---|---|---|---|
| 6,089,713 | A | 7/2000 | Hof et al. |
| 6,542,249 | B1 | 4/2003 | Kofman et al. |
| 7,400,414 | B2 | 7/2008 | Tobiason et al. |
| 7,477,401 | B2 | 1/2009 | Marx et al. |
| 7,508,529 | B2 | 3/2009 | Gladnick et al. |
| 7,626,705 | B2 | 12/2009 | Altendorf |
| 7,652,275 | B2 | 1/2010 | Gladnick |
| 7,660,688 | B2 | 2/2010 | Ishikawa et al. |
| 7,738,113 | B1 | 6/2010 | Marx et al. |
| 7,873,488 | B2 | 1/2011 | Nahum et al. |
| 7,876,456 | B2 | 1/2011 | Sesko |
| 7,990,522 | B2 | 8/2011 | Sesko |
| 8,085,295 | B2 | 12/2011 | Tobiason et al. |
| 8,194,251 | B2 | 6/2012 | Emtman et al. |
| 8,212,997 | B1 | 7/2012 | Xie |
| 8,229,694 | B2 | 7/2012 | Nakagawa et al. |
| 8,438,746 | B2 | 5/2013 | Usui |
| 8,817,240 | B2 | 8/2014 | Jones et al. |
| 8,863,398 | B2 | 10/2014 | Luepke et al. |
| 9,151,602 | B2 | 10/2015 | Noda et al. |
| 9,329,026 | B2 | 5/2016 | Altendorf |
| 9,746,303 | B2 | 8/2017 | Nakagawa et al. |
| 9,952,045 | B2 | 4/2018 | Yasuno |
| 9,958,266 | B2 | 5/2018 | Patzwald et al. |
| 10,429,167 | B2 | 10/2019 | Nakagawa et al. |
| 10,584,955 | B2* | 3/2020 | Nahum ................ G01B 5/0004 |
| 2004/0200085 | A1* | 10/2004 | Sakata .................... G01B 7/12 |
| | | | 33/550 |
| 2007/0175022 | A1 | 8/2007 | Chang |
| 2008/0024753 | A1 | 1/2008 | Gladnick et al. |
| 2008/0024793 | A1 | 1/2008 | Gladnick |
| 2008/0032066 | A1 | 2/2008 | Stiblert et al. |
| 2010/0283989 | A1 | 11/2010 | Sesko |
| 2011/0133054 | A1 | 6/2011 | Campbell |
| 2011/0295408 | A1* | 12/2011 | Burgel ................ G05B 19/401 |
| | | | 700/192 |
| 2012/0050723 | A1 | 3/2012 | Emtman et al. |
| 2013/0135715 | A1 | 5/2013 | Chen et al. |
| 2013/0162972 | A1 | 6/2013 | Sesko et al. |
| 2013/0163006 | A1 | 6/2013 | Sesko |
| 2014/0043469 | A1 | 2/2014 | Engel et al. |
| 2017/0010452 | A1 | 1/2017 | Patzwald et al. |
| 2017/0248399 | A1 | 8/2017 | Takahama |
| 2021/0254966 | A1* | 8/2021 | Hur ...................... G01B 5/0004 |

\* cited by examiner

WORKPIECE HOLDER FOR UTILIZATION IN METROLOGY SYSTEM FOR MEASURING WORKPIECE IN DIFFERENT ORIENTATIONS

BACKGROUND

Technical Field

This disclosure relates to precision metrology, and more particularly to precision surface profile measurement devices and systems.

Description of the Related Art

Quality control of objects that include specific surface profiles produced by molding and/or machining, or the like, is becoming increasingly demanding in terms or throughput, measurement resolution, and accuracy. Such objects may include, but are not limited to, optical components, electronic components, miniature mechanical components, etc. For example, certain types of lenses are small, produced in very high volumes, and are expected to provide very good optical performance. Ideally, such lenses should be inspected to insure proper function. Confirming a lens surface profile may insure proper optical performance, fit, etc. However, sub-micron level, or even nanometer level, surface profile measurement tolerances may be required in order to confirm a surface profile with desired characteristics in some applications.

Various known contact or non-contact sensors may be used for such surface profile measurements, and may be operated in combination with various types of metrology systems (e.g., measurement systems). As some examples of measurement systems that may utilize contact and/or non-contact sensors for such purposes, an exemplary coordinate measuring machine (CMM) is disclosed in U.S. Pat. No. 7,660,688, and exemplary machine vision systems (e.g., which may include a mechanical probe system) are disclosed in U.S. Pat. Nos. 8,085,295 and 8,194,251, each of which is hereby incorporated herein by reference in its entirety. In the example of the '688 patent, the CMM includes a sensor (e.g., a probe), a movement mechanism and a controller. Such movement mechanisms of CMMs typically enable the probe to move in mutually-orthogonal X, Y, and Z directions. In some instances, a contact sensor may be utilized (e.g., a touch probe, a scanning probe, etc.), with a probe tip that physically touches a workpiece (i.e., an object) to be measured.

An example of a non-contact sensor that is suitable for use (e.g., as a probe) with such measurement systems is a chromatic range sensor (CRS), such as a chromatic point sensor (CPS), such as that disclosed in U.S. Pat. Nos. 7,876,456; 7,990,522; 8,194,251; and 9,958,266, each of which is hereby incorporated herein by reference in its entirety. As another example of a non-contact sensor, a vision portion (e.g., as part of a vision system) and/or a vision probe may be utilized with such systems. Such non-contact sensors as utilized with CMMs are described in U.S. Pat. Nos. 7,508,529; 7,652,275; and 8,085,295 each of which is hereby incorporated herein by reference in its entirety.

While utilization of such measurement systems with such contact and non-contact sensors have enabled measuring of surface profiles of workpieces, such processes have certain limitations (e.g., related to measuring different portions of a workpiece that may be difficult to reach and/or otherwise measure with the given configuration). Techniques that may improve or otherwise enhance the utilization of such measurement systems for measuring surface profiles of workpieces would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A metrology system is provided including a sensing configuration, a workpiece holder, a rotary portion for rotating the workpiece holder, and a processing device configuration. The sensing configuration (e.g., including a probe) is configured to obtain 3-dimensional surface data for a workpiece. The workpiece holder is configured to hold a workpiece, and includes a workpiece holding portion and at least three reference features. The workpiece holding portion includes workpiece engaging portions (e.g., which contact the workpiece), wherein each workpiece engaging portion is configured to engage the workpiece so that the workpiece engaging portions (e.g., in cooperation with one another) rigidly hold the workpiece in the workpiece holding portion.

The at least three reference features are each configured to be sensed by the sensing configuration, both when the workpiece holder is in a first orientation (e.g., in which a first side of the workpiece holder faces toward the sensing configuration and a second side of the workpiece holder faces away from the sensing configuration), and when the workpiece holder is rotated (e.g., by the rotary portion) to be in a second orientation (e.g., in which the second side of the workpiece holder faces toward the sensing configuration and the first side of the workpiece holder faces away from the sensing configuration).

The processing device configuration includes one or more processors and a memory coupled to the one or more processors which stores program instructions that when executed by the one or more processors cause the one or more processors to perform functions such as the following. The sensing configuration may be controlled to obtain 3-dimensional reference feature data for determining first 3-dimensional positions of the at least three reference features of the workpiece holder while the workpiece holder is in the first orientation. The sensing configuration may also be controlled to obtain first 3-dimensional surface data for a first side of a workpiece that is held in the workpiece holder while the workpiece holder is in the first orientation. The rotary portion may be controlled to rotate the workpiece holder from the first orientation to the second orientation. The sensing configuration may be controlled to obtain 3-dimensional reference feature data for determining second 3-dimensional positions of the at least three reference features while the workpiece holder is in the second orientation. The sensing configuration may be controlled to obtain second 3-dimensional surface data for a second side of the workpiece that is held in the workpiece holder while the workpiece holder is in the second orientation. The determined first and second 3-dimensional positions of the at least three reference features may be utilized for combining the first 3-dimensional surface data for the workpiece with the second 3-dimensional surface data for the workpiece.

In various implementations, the first and second sides of the workpiece may correspond to front and back sides of the workpiece, respectively, and the first and second 3-dimensional surface data may be for front and back surfaces of the workpiece, respectively. In various implementations, the workpiece holder may be rotated by approximately 180 degrees from the first orientation to be in the second orientation. In various implementations, the rotary portion may rotate the workpiece holder around a horizontal axis.

In various implementations, the first 3-dimensional surface data for the workpiece may be combined with the second 3-dimensional surface data for the workpiece in a common 3-dimensional coordinate system. In various implementations, the combining of the first 3-dimensional surface data for the workpiece with the second 3-dimensional surface data for the workpiece may comprise performing a rigid body transformation based at least in part on the first and second 3-dimensional positions of the at least three reference features. In various implementations, the second 3-dimensional surface data for the workpiece may not overlap with the first 3-dimensional surface data for the workpiece.

In various implementations, the sensing configuration may comprise a non-contact sensor (e.g., chromatic range sensor, a structured light sensor, a laser sensor, an image sensor, an interferometric sensor, etc.) In various implementations, the non-contact sensor may comprise an optical axis which is oriented along a z-axis direction in a machine coordinate system of the metrology system, and the rotary portion may rotate the workpiece holder around a rotation axis that is perpendicular to the z-axis of the machine coordinate system.

In various implementations, the metrology system may further include a contact sensor comprising at least one of a scanning probe or touch probe that is also utilized to obtain 3-dimensional reference feature data for determining 3-dimensional positions of the at least three reference features and to obtain 3-dimensional surface data for the workpiece, both when the workpiece holder is in the first orientation and in the second orientation.

In various implementations, the 3-dimensional reference feature data may comprise 3-dimensional reference feature surface data corresponding to surface points on surfaces of the reference features. In various implementations, for each reference feature, a distance between each surface point and a center point of the corresponding reference feature may be equal to a radius of the reference feature, and the determining of the 3-dimensional position of the reference feature may comprise determining the 3-dimensional position of the center point of the reference feature. In various implementations, each of the at least three reference features may be a spherical reference feature.

In various implementations, the workpiece holder may comprise a body portion which includes the reference features and which further includes a central aperture, for which the workpiece holding portion may have an outer boundary with a size and shape which is configured to fit within the central aperture such that the workpiece holding portion is configured to be secured within the body portion. In various implementations, the metrology system may further include a plurality of additional workpiece holding portions each having an outer boundary with a same shape and size as the outer boundary of the workpiece holding portion such that the workpiece holding portions are interchangeable in that the workpiece holding portions are each configured to be interchanged to fit within the central aperture and be secured within the body portion. In various implementations, each workpiece holding portion may comprise a plurality of workpiece engaging portions for engaging a workpiece, and for which each workpiece holding portion of the plurality of workpiece holding portions is configured to hold a workpiece of a different size.

In various implementations, a computer-implemented method is provided for operating a metrology system including a sensing configuration for obtaining 3-dimensional surface data for a workpiece that is held in a workpiece holder. The computer-implemented method, under control of one or more computing systems configured with executable instructions, may perform operations such as the following. The sensing configuration of the metrology system may be operated to obtain 3-dimensional reference feature data for determining first 3-dimensional positions of at least three reference features of the workpiece holder while the workpiece holder is in a first orientation. The sensing configuration may also be operated to obtain first 3-dimensional surface data for a first side of a workpiece that is held in the workpiece holder while the workpiece holder is in the first orientation. A rotary portion may be operated to rotate the workpiece holder to be in a second orientation. The sensing configuration may be operated to obtain 3-dimensional reference feature data for determining second 3-dimensional positions of the at least three reference features while the workpiece holder is in the second orientation. The sensing configuration may also be operated to obtain second 3-dimensional surface data for a second side of the workpiece that is held in the workpiece holder while the workpiece holder is in the second orientation. The determined first and second 3-dimensional positions of the at least three reference features may be utilized for combining the first 3-dimensional surface data for the workpiece with the second 3-dimensional surface data for the workpiece. In various implementations, the combined 3-dimensional surface data may be utilized for determining one or more dimensions of the workpiece (e.g., including a distance between the first and second sides of the workpiece, etc.)

In various implementations, the first 3-dimensional surface data for the workpiece may be combined with the second 3-dimensional surface data for the workpiece in a common 3-dimensional coordinate system. In various implementations, the combining of the first 3-dimensional surface data for the workpiece with the second 3-dimensional surface data for the workpiece may comprise performing a rigid body transformation based at least in part on the first and second 3-dimensional positions of the at least three reference features. In various implementations, the 3-dimensional reference feature data may comprise 3-dimensional reference feature surface data corresponding to surface points on surfaces of the reference features, and for each reference feature in each orientation of the workpiece holder the determining of the 3-dimensional position of the reference feature may comprise determining a 3-dimensional position of a center point of the reference feature based at least in part on the 3-dimensional reference feature surface data.

In various implementations, a workpiece holding configuration is provided for utilization in a metrology system which includes a sensing configuration that is utilized for obtaining 3-dimensional surface data for a workpiece. In various implementations, the workpiece holding configuration includes a workpiece holder which comprises a workpiece holding portion and at least three reference features. The workpiece holding portion comprises a plurality of workpiece engaging portions, wherein each workpiece engaging portion is configured to engage a portion of the workpiece to rigidly hold the workpiece in the workpiece holder. The at least three reference features are each configured to be sensed by the sensing configuration of the metrology system both when the workpiece holder is in a first orientation and when the workpiece holder is rotated to be in a second orientation.

In the first orientation, the sensing of the at least three reference features by the sensing configuration enables first 3-dimensional positions of the at least three reference features to be determined. In the first orientation, a first side of a workpiece that is held by the workpiece holder is oriented so as to enable the sensing configuration to obtain first 3-dimensional surface data for a first surface on the first side of the workpiece. In the second orientation, the sensing of the at least three reference features by the sensing configuration enables second 3-dimensional positions of the at least three reference features to be determined. In the second orientation, a second side of the workpiece that is held by the workpiece holder is oriented so as to enable the sensing configuration to obtain second 3-dimensional surface data for a second surface on the second side of the workpiece. The determined first and second 3-dimensional positions of the at least three reference features enables the first 3-dimensional surface data for the workpiece to be combined with the second 3-dimensional surface data for the workpiece.

In various implementations, the workpiece holding configuration may further comprise a rotary portion configured to rotate the workpiece holder between different orientations, including rotating the workpiece holder from the first orientation to the second orientation. In various implementations, the at least three reference features may be spherical reference features. In various implementations, the workpiece holder may further comprise a body portion which includes the reference features and which further includes a central aperture, for which the workpiece holding portion is configured to be secured within the central aperture. In various implementations, the workpiece holding configuration further comprises a plurality of additional workpiece holding portions that are interchangeable in that the workpiece holding portions are each configured to be interchangeably secured within the central aperture of the workpiece holder, wherein each workpiece holding portion comprises a plurality of workpiece engaging portions for engaging a workpiece, and for which each workpiece holding portion is configured to hold a workpiece of a different size. In various implementations, the plurality of workpiece engaging portions may comprise pneumatic engaging portions which utilize pneumatic features for engaging the workpiece.

DETAILED DESCRIPTION

Figure 1:
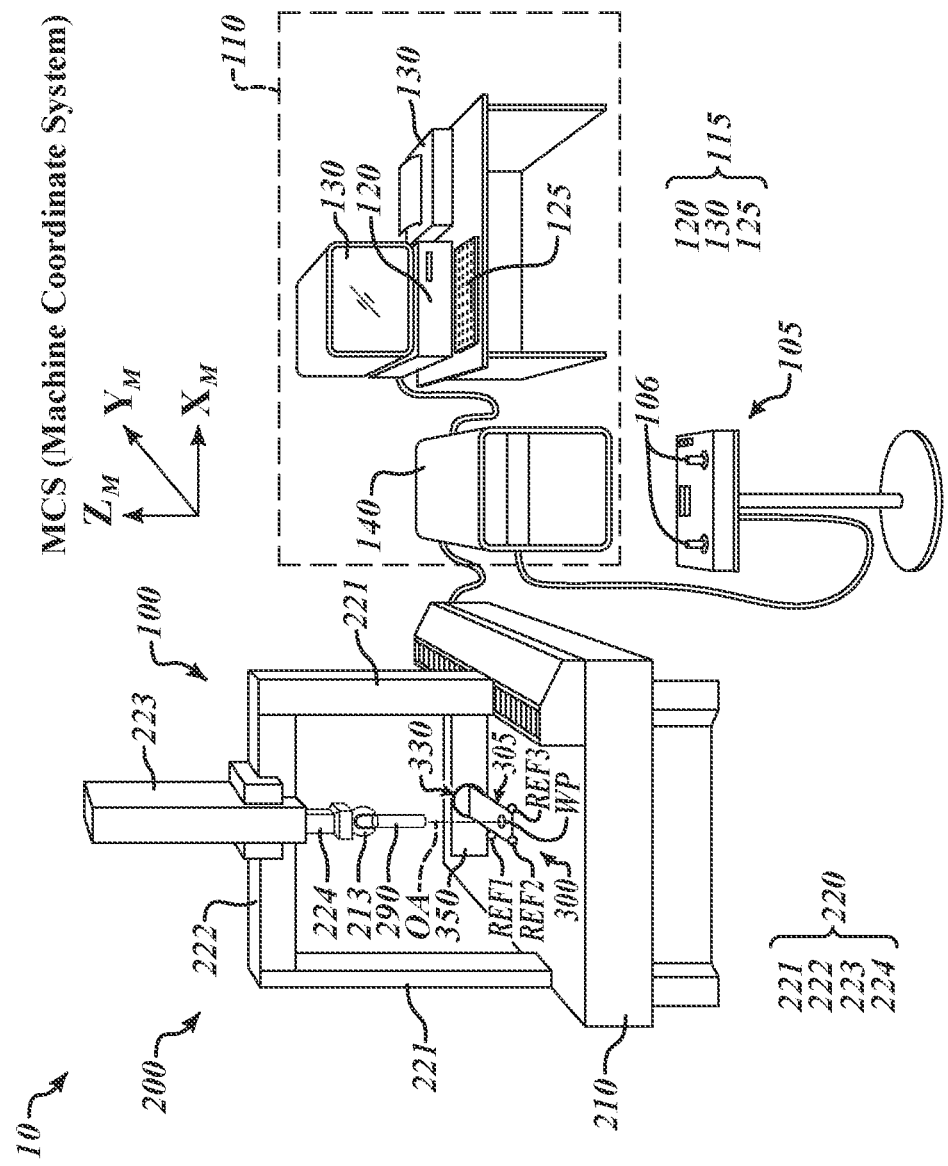
FIG. 1 is a diagram showing various components of a metrology system including a coordinate measuring machine with a sensing configuration directed toward a workpiece in a workpiece holder according to an embodiment.
Figure 2:
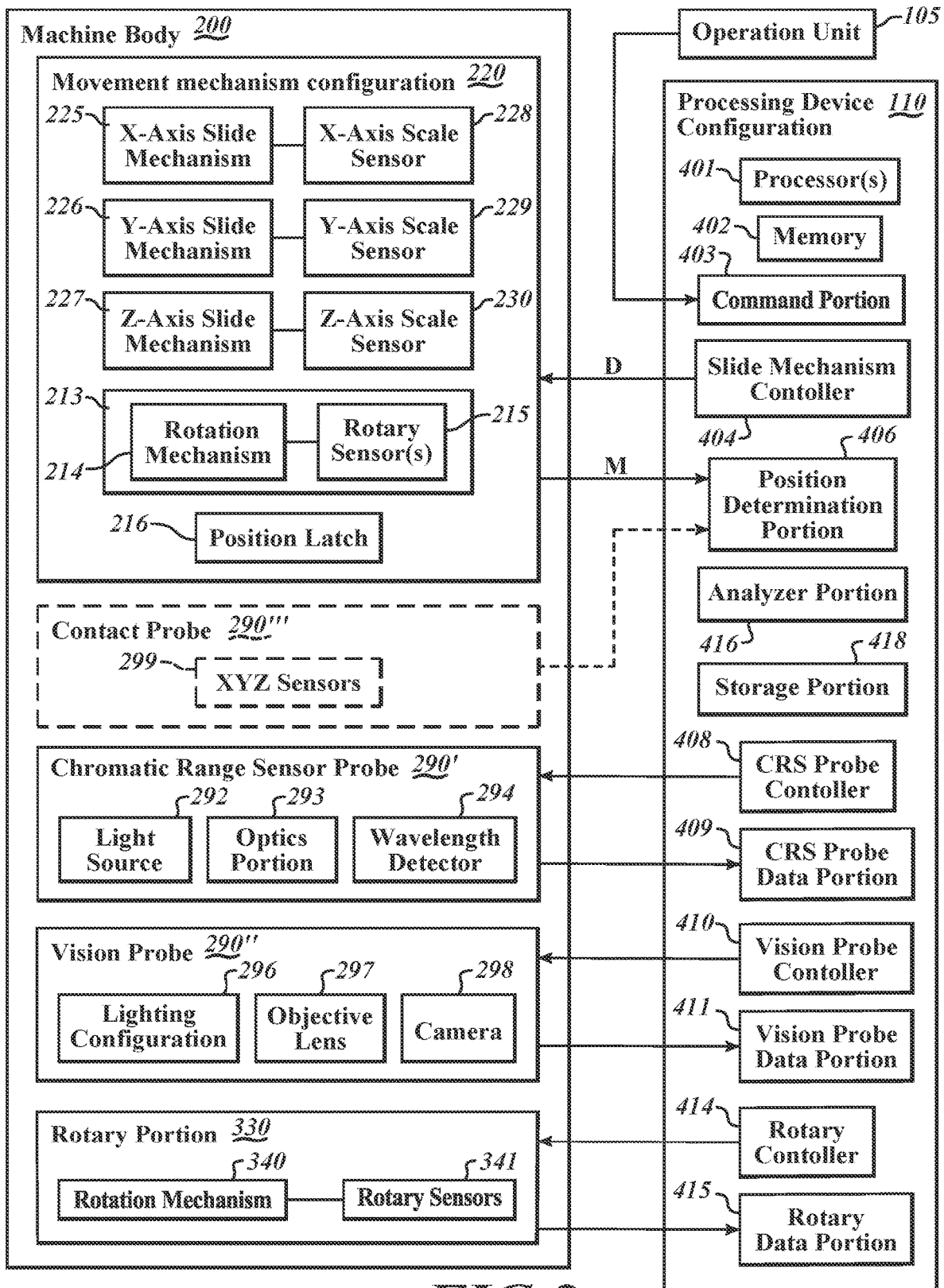
FIG. 2 is a block diagram showing various control elements of a metrology system with a coordinate measuring machine and workpiece holder such as that of FIG. 1.

FIG. 1 is a diagram showing various components of a metrology system 10, and FIG. 2 is a block diagram showing various related control elements. As shown in FIG. 1, the metrology system 10 includes a coordinate measuring machine 100 with a sensing configuration 290 (e.g., including a probe) directed toward a workpiece WP in a workpiece holder 305 of a workpiece holding configuration 300, according to an embodiment. As will be described in more detail below, the workpiece holding configuration 300 includes the workpiece holder 305 and a rotary portion 330 for rotating the workpiece holder 305, which is supported by a support portion 350 (e.g., for which the workpiece holding configuration 300 may be placed or otherwise located on or as a stage of the coordinate measuring machine 100).

As shown in FIG. 1, the coordinate measuring machine 100 includes a machine body 200 that moves the sensing configuration 290, an operation unit 105 having manually-operated joysticks 106, and a processing device configuration 110. The machine body 200 includes a surface plate 210 (i.e., also referenced herein as a stage 210), a movement mechanism configuration 220 (see also FIG. 2), and the sensing configuration 290. The movement mechanism configuration 220 includes an X-axis slide mechanism 225, a Y-axis slide mechanism 226, and a Z-axis slide mechanism 227 (FIG. 2) that are provided to stand on the surface plate 210 for holding and three-dimensionally moving the sensing configuration 290 relative to the workpiece WP to be measured as shown in FIG. 1. The movement mechanism configuration 220 also includes a probe head 213.

Specifically, the movement mechanism configuration 220 includes beam supports 221 capable of moving in a $Y_M$ direction in a machine coordinate system (MCS), a beam 222 bridged between the beam supports 221, a column 223 capable of moving in an $X_M$ direction in the machine coordinate system on the beam 222, and a Z-axis movement member 224 (e.g., a spindle) capable of moving in a $Z_M$ direction in the machine coordinate system inside the column 223 as shown in FIG. 1. The X-axis slide mechanism 225, the Y-axis slide mechanism 226, and the Z-axis slide mechanism 227 shown in FIG. 2 are provided between the beam 222 and the column 223, between the surface plate 210 and the beam supports 221, and between the column 223 and the Z-axis movement member 224, respectively. The sensing configuration 290 is attached to a probe head 213, which in some implementations includes a rotation mechanism 214 (FIG. 2) and which is attached to and supported by an end of the Z-axis movement member 224. In some implementations, the rotation mechanism 214 enables the sensing configuration 290 to be rotated relative to the Z-axis movement member 224. In some implementations, the probe head 213 with the rotation mechanism 214 includes one or more rotary sensors 215 (see FIG. 2) for sensing an angular rotation/position/orientation of the sensing configuration 290. In some implementations, a rotation mechanism 214 is not included, for which the sensing configuration 290 generally remains aligned with the $Z_M$-axis of the machine coordinate system (e.g., with an optical axis OA parallel with the $Z_M$-axis). The X-axis slide mechanism 225, the Y-axis slide mechanism 226, and the Z-axis slide mechanism 227 are each configured to move the sensing configuration 290 in the mutually orthogonal X, Y, Z-axes directions, respectively, within the machine coordinate system.

As shown in FIG. 2, the X-axis slide mechanism 225, the Y-axis slide mechanism 226, and the Z-axis slide mechanism 227 are provided with an X-axis scale sensor 228, a Y-axis scale sensor 229, and a Z-axis scale sensor 230, respectively. Thus, a moving amount of the sensing configuration 290 in the X-axis, Y-axis and Z-axis directions in the machine coordinate system (MCS) can be obtained from outputs of the X-axis scale sensor 228, the Y-axis scale sensor 229, and the Z-axis scale sensor 230. In the illustrated implementation, the moving directions of the X-axis slide mechanism 225, the Y-axis slide mechanism 226, and the Z-axis slide mechanism 227 coincide with the $X_M$ direction, the $Y_M$ direction, and the $Z_M$ direction in the machine coordinate system (MCS), respectively. In various implementations, these relatively straightforward correlations and the associated components may help ensure high levels of accuracy and relatively simplified processing of the movements and position control/sensing in the $X_M$, $Y_M$ and $Z_M$ directions.

In various implementations, the sensing configuration 290 may be utilized for performing operations for determining and/or measuring a surface profile of the workpiece WP (e.g., including of surfaces on opposite sides of the workpiece WP through operation of the workpiece holding configuration 300, as will be described in more detail below). In various implementations, the position of the sensing configuration 290 may be adjusted (e.g., in x and y directions) so that an optical axis OA of the sensing configuration is directed toward a surface of the workpiece WP. The x-axis, y-axis and z-axis slide mechanisms 225, 226 and 227 (e.g., moving in mutually orthogonal directions) may in conjunction move the sensing configuration 290 to data acquisition positions for acquiring/obtaining data for the workpiece surface (e.g., for obtaining 3-dimensional surface data).

As shown in FIG. 2, the operation unit 105 is connected to a command portion 403 of the processing device configuration 110. Various commands can be inputted to the machine body 200 and/or the processing device configuration 110 via the operation unit 105. As shown in FIG. 1, the processing device configuration 110 includes a motion controller 140 and a host computer system 115. In various implementations, the processing device configuration 110 may compute surface coordinates of the workpiece WP to be measured based at least in part on the moving amount of the sensing configuration 290 moved by the movement mechanism configuration 220 and/or the analysis of data obtained by the sensing configuration 290, as will be described in more detail below. In various implementations, the surface coordinates of the 3-dimensional surface data may correspond to a depth map and/or a surface topography of the workpiece and/or a workpiece surface, and may be based on relative positions (e.g., indicated by coordinates) of surface points on the workpiece.

The motion controller 140 of FIG. 1 mainly controls the movement of the sensing configuration 290. The host computer system 115 processes movements and positions carried out and obtained in the machine body 200. In the present implementation, the processing device configuration 110 having a combined function of the motion controller 140 and the host computer system 115 is shown in the block diagram of FIG. 2 and will be described in more detail below. The host computer system 115 includes a computer 120, an input unit 125 such as a keyboard and output units 130 such as a display and a printer.

Those skilled in the art will appreciate that the host computer system 115 and/or other computing systems and/or control systems described or usable with the elements and methods described herein may generally be implemented using any suitable computing system or device, including distributed or networked computing environments, and the like. Such computing systems or devices may include one or more general purpose or special purpose processors (e.g., non-custom or custom devices) that execute software to perform the functions described herein. Software may be stored in memory, such as random access memory (RAM), read only memory (ROM), flash memory, or the like, or a combination of such components. Software may also be stored in one or more storage devices, such as optical based disks, flash memory devices, or any other type of non-volatile storage medium for storing data. Software may include one or more program modules that include processes, routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

As shown in FIG. 2, the processing device configuration 110 includes one or more processors 401, a memory 402, the command portion 403, a slide mechanism controller 404, a position determination portion 406, a chromatic range sensor probe controller 408, a chromatic range sensor probe data portion 409, a vision probe controller 410, a vision probe data portion 411, a rotary controller 414, a rotary data portion 415, an analyzer portion 416, and a storage portion 418. In various implementations, the one or more processors 401 may be included in a single device or different devices or otherwise distributed (e.g., between the computer 120 and the motion controller 140, etc.) Similarly, the memory 402 may be included in a single device or different devices or otherwise distributed, and for which the memory is coupled to the one or more processors 401 and stores program instructions that when executed by the one or more processors 401 causes the one or more processors to perform various functions (e.g., for storing and/or performing the operations of certain of the elements/components of the processing device configuration 110, such as the operations of the routine 700 of FIG. 7, as will be described in more detail below). In various implementations, the storage portion 418 may be included as part of the memory 402. More specifically, in various implementations the storage portion 418 may comprise a portion of the computer memory 402 for storing certain software, routines, data, etc., for the operation of the processing device configuration 110, etc.

The command portion 403 shown in FIG. 2 gives predetermined commands to the slide mechanism controller 404 (e.g., on the basis of commands inputted by the operation unit 105 or the input unit 125). The command portion 403 generates, as a positional command to the movement mechanism configuration 220, a coordinate value in the machine coordinate system for each control cycle in consideration of, for example, moving directions, moving distances, moving speeds, and the like to move the sensing configuration 290 to a plurality of positions (e.g., data acquisition positions, etc.)

The slide mechanism controller 404 shown in FIG. 2 performs drive control by outputting a drive control signal D in response to a command from the command portion 403, thereby passing an electric current through motors of the X-axis, Y-axis, and Z-axis slide mechanisms 225, 226, and 227 in the movement mechanism configuration 220.

A position latch 216 in one implementation communicates with the various sensors and/or drive mechanisms in order to ensure that the coordinates of the CMM 100 and the sensing configuration 290 at the time that data is acquired are properly synchronized. More specifically, in various implementations the position latch 216 may be utilized to help ensure the accuracy of the measurements derived from the data acquired by the sensing configuration 290. In various implementations, the operations of the position latch 216 enable the CMM machine coordinates (which reflect the position of the connection point or other reference point of the sensing configuration 290 during a particular measurement) to be properly combined with the position data determined from the sensing configuration (e.g., which are relative to the sensing configuration's position). In certain implementations, the position latch 216 may be utilized to trigger measurements from CMM position sensors (e.g., sensors 228-230, etc.), which may include scales, encoders or other sensing elements that track an overall position of the sensing configuration 290 (e.g. including its base position) in the machine coordinate system. In some implementations, the position latch 216 may also trigger data acquisition from the sensing configuration 290.

In various implementations, a probe autojoint connection is provided that is an electro-mechanical connection that fastens the probe head 213 rigidly and mechanically to a sensor (e.g., a probe) of the sensing configuration 290, in a way such that it can be disconnected from one sensor and attached to another. In one implementation, the probe autojoint connection may include first and second mating auto exchange joint elements, wherein the first auto exchange joint element is mounted to the probe head 213, and the second mating auto exchange joint element is mounted to the attached sensor. In one implementation, the probe autojoint connection has mating electrical contacts or connections so that when a sensor is attached, the contacts automatically engage and make electrical connections. In certain implementations, multiple sensors may be simultaneously attached and may each be utilized as part of the measurement operations (e.g., of the sensing configuration 290, etc.)

As illustrated in FIG. 2, different sensors 290', 290" and/or 290''' may be utilized for various measurement operations. The sensors 290', 290" and 290''' are also alternatively referenced herein as a chromatic range sensor (CRS) probe 290', a vision probe 290" and a contact probe 290''', respectively. As described herein, in various implementations the metrology system 10 may utilize only a single sensor (e.g., sensor 290', 290" or 290'''), or may utilize multiple such sensors (e.g., sequentially or simultaneously, utilizing different types of such non-contact and/or contact sensors). In various implementations, multiple sensors may be available in a changing rack (not shown) of the metrology system 10, from which such sensors may each be selected to be attached to the movement mechanism configuration 220 as part of the sensing configuration 290, or in a configuration in which multiple such sensors may be simultaneously attached to the movement mechanism configuration 220 and utilized as part of the sensing configuration 290 or otherwise for obtaining 3-dimensional surface data for the workpiece.

In various implementations, the chromatic range sensor probe 290' may have certain similarities to systems described in U.S. Pat. Nos. 7,876,456 and 7,990,522 (the '456 and '522 patents, respectively), which are each hereby incorporated herein by reference in their entireties. As shown in FIG. 2, the chromatic range sensor probe 290' includes a light source 292, an optics portion 293 and a wavelength detector 294. In some implementations, the chromatic range sensor probe 290' may be a chromatic point sensor probe which in some instances may measure a single measurement point at a time. However, in various embodiments alternative types of chromatic range systems, such as a chromatic line sensor probe, may be utilized.

In operation of the chromatic range sensor probe 290', in various implementations the light source 292 provides broadband (e.g. white) source light which is emitted from a fiber end through a fiber aperture (not shown) and which is focused by the optics portion 293, which includes a lens or lenses that provide an axial chromatic dispersion, such that a focal point along the optical axis OA is at different distances depending on the wavelength of the light, as is known for chromatic confocal sensor systems. The source light forms a measurement beam directed along the optical axis OA that includes a wavelength that is focused on a surface of a workpiece WP at a position Z relative to the chromatic range sensor probe 290'. Upon reflection from the workpiece surface, reflected light is refocused by the optics portion 293 onto the fiber aperture. Due to the axial chromatic dispersion, only one wavelength will have a front focus dimension that matches the measurement distance from the chromatic range sensor probe 290' to the workpiece surface. The chromatic range sensor probe 290' is configured such that the wavelength that is best focused at the workpiece surface will also be the wavelength of the reflected light that is best focused at the fiber aperture. The fiber aperture spatially filters the reflected light such that predominantly the best focused wavelength passes through the fiber aperture and into a core of an optical fiber cable (not shown). The optical fiber cable routes the reflected signal light to the wavelength detector 294 that is utilized for determining the wavelength having the dominant intensity, which corresponds to the measurement distance to the workpiece surface.

As illustrated in FIG. 2, the CRS probe controller 408 controls the CRS probe 290' (e.g., controlling the light source 292 and/or wavelength detector 294, etc. for obtaining data indicating the measurement distance to the workpiece surface and thus in some instances a corresponding Z-height of a corresponding surface point on the workpiece surface). In various implementations, the CRS probe controller 408 does not have to control the movement of the CRS probe 290'. Instead, those aspects may be controlled by the CMM movement mechanism configuration 220, which moves the CRS probe 290' closer and/or further from the workpiece and to different positions (e.g., x and y positions) for determining measurement distances to different surface points on the workpiece surface. In some implementations, the measurement distances may indicate Z coordinates (e.g., in the MCS) of the surface points on the workpiece surface, while the X and Y coordinates of each of the surface points may be indicated by the X and Y coordinates of the CRS probe 290' as moved by the movement mechanism configuration 220. The CRS probe data portion 409 receives the output of the CRS probe 290' (i.e., as may indicate the measurement distances to the workpiece surface points, etc.) The analyzer portion 416 may be utilized to perform associated analysis (e.g., analysis of the output from the CRS probe 290' and associated position indications from the sensors 228-230 for determining the relative location of each of the surface points on the workpiece surface, such as for determining a 3-dimensional surface profile of the workpiece surface, etc.)

The vision probe 290" may in various implementations include a lighting configuration 296, an objective lens 297, and a camera 298. In various implementations, the objective lens 297 may be a multi-lens optical element and may be chosen with a range of magnifications. For example, different objective lenses with different magnifications may be available for selection, and an objective lens to be utilized in the vision probe 290" may be selected based on a desired magnification for certain applications (e.g., for which an objective lens with a relatively higher magnification may be selected to provide relatively higher resolution with a tradeoff of a smaller range of points-from-focus images, etc.)

With respect to the operations of the vision probe 290", an image stack (of images at different focus positions) may be acquired, wherein the relative locations/focus positions of the images in the image stack are in terms of the probe coordinate system (PCS), which in some implementations may be in relation to the reference position of the probe within the MCS. In order to determine the overall position of the workpiece surface points within the machine coordinate system (MCS), the PCS position data of the surface points may in some implementations be converted and/or otherwise combined with the MCS position data, to thereby determine the total overall positions of the surface points (e.g., as may be referenced in terms of the MCS.).

As illustrated in FIG. 2, the vision probe controller 410 controls the vision probe 290" (e.g., controlling the lighting configuration 296 and the camera 298, etc. for obtaining images of an image stack, etc.). In various implementations, the vision probe controller 412 does not have to control the movement or focusing of the vision probe 290". Instead, those aspects may be controlled by the CMM movement mechanism configuration 220, which moves the vision probe 290" closer and/or further from the workpiece in order to obtain an image stack (i.e., moves the vision probe 290" to each image acquisition position along the $Z_M$-axis). In various implementations, the vision probe 290" may be moved up and down along the Z-axis of the MCS by the Z-axis slide mechanism 227 (including movement of the Z-axis movement member 224 within the column 223) to each image acquisition position for capturing the respective images of the image stack. In various implementations, a focus distance of the vision probe 290" may be primarily determined by the objective lens 297 (e.g., for which the focus distance in front of the vision probe 290" may be constant during measurement operations as corresponding to the objective lens 297 that is selected/utilized in the vision probe 290").

In various implementations, for each captured image in an image stack, a focus metric may be calculated based on a region or sub-region of interest ROI(k) (e.g. a set of pixels) in the image (e.g., with the corresponding surface point at the center of the region or sub-region of interest ROI(k)). The focus metric is related to the corresponding position of the vision probe 290" and the corresponding focus position, along the direction of the image stack acquisition axis (e.g., the Z-axis of the MCS) at the time that the image was captured. This results in focus curve data (e.g. a set of the focus metrics at the positions where the images were captured, which is one type of focus peak determining data set), which may be referred to simply as a "focus curve" or "autofocus curve". In one embodiment, the focus metric values may involve a calculation of the contrast or sharpness of the region of interest in the image. In various implementations, a Z-position corresponding to the peak of the focus curve, which corresponds to the best focus position along the image stack acquisition axis, is the Z-height position for the region of interest used to determine the focus curve.

In various implementations, the vision probe data portion 414 receives the output of the vision probe 290" (i.e., the image data for the images of the image stack). The analyzer portion 416 may be utilized to perform the associated analysis (e.g., the points-from-focus (PFF) analysis or other analysis of the image stack for determining the relative location/3-dimensional position of each of the surface points on the workpiece surface along the probe Z-axis direction, such as to determine a 3-dimensional surface profile of the workpiece surface, etc.)

The contact probe 290''' may in various implementations include XYZ sensor(s) 299. In various implementations, the contact probe 290''' may be a touch probe or a scanning probe, etc., which has a probe tip that physically touches the workpiece being measured. In some embodiments, such a contact probe 290''' may be used in addition to/in combination with one or more additional sensors (e.g., the sensor 290' and/or the sensor 290", etc.) For example, after the sensor 290' or 290" is used to obtain data to determine a 3-dimensional profile of the workpiece surface, the sensor 290' or 290" may be detached/removed from the CMM 100 (e.g., detached from the probe head 213). The contact probe 290" may then subsequently be attached to the CMM 100 (e.g., attached to the probe head 213). To that end, in some examples, the CMM 100 may have different sensors/probes (e.g., 290', 290", 290''', etc.) stored on a probe rack (not shown) and move the probe head 213 to a proper position for attaching and detaching the different probes. The contact probe 290''' may then be used to physically touch and verify certain measurements or surface points (e.g., for surface points that may have been difficult to view/determine utilizing the sensor 290' and/or 290").

In various implementations, if there are surface points on the workpiece surface that may have been difficult to capture and/or were partially hidden from the sensor 290' and/or 290", the contact probe 290''' may in some instances be utilized to physically touch such surface points for a measurement. In general, in addition to the utilization of the sensors 290' and/or 290" as part of the sensing configuration 290, the contact probe 290''' may also be utilized (e.g., to obtain 3-dimensional reference feature data for determining 3-dimensional positions of the reference features REF1, REF2 and REF3 and/or to obtain 3-dimensional surface data for the workpiece WP, such as when the workpiece holder 305 is in the first orientation and/or in the second orientation, as will be described in more detail below).

When utilized with a sensor (e.g., sensor 290', 290", or 290''', etc.), the CMM movement mechanism configuration 220, in particular the position sensors thereof (e.g., position sensors 228-230), may provide measurement outputs M to the position determination portion 406, which determines the position of the probe head 213 (or other connection point or reference position) of the sensor 290', 290" or 290''' within the CMM's machine coordinate system (MCS). For example, the position determination portion 406 may provide the X, Y and Z coordinates within the machine coordinate system for the probe head 213 or other connection point or reference point of the sensor 290', 290" or 290'''.

When the contact probe 290''' is attached, the contact probe 290''' may include a mechanism that allows the probe tip to move (in small amounts) relative to the rest of the contact probe 290''', and corresponding sensors (e.g., the XYZ sensors 299) that provide sensor data which indicates the position of the probe tip (i.e., a probe stylus tip) that is actually touching the workpiece surface in a probe coordinate system of the contact probe 290'''. Measurement synchronization trigger signals (e.g., provided in relation to the operations of the position latch 216, etc.) trigger measurements that track an overall position and orientation of the contact probe 290''' (e.g., of the probe head 213) in the machine coordinate system, as well as triggering a local surface measurement using the contact probe 290''' in the probe coordinate system. The position determining portion 406 may use and combine the coordinates measured in the probe coordinate system and the position of the contact probe 290''' measured in the machine coordinate system to determine the overall position of the probe tip and, thus, the overall positions of the measured/detected surface points on the workpiece (e.g., as may be referenced in the machine coordinate system).

In contrast to such determinations utilizing the contact probe 290''', when the sensor 290' or 290'' is utilized as described herein with respect to various exemplary embodiments, the position determination portion 406 may only determine the position of the probe head 213 at the top of the sensor 290' or 290'' (or other reference or attachment position). In order to determine coordinates of surface points on a workpiece, the information from an analysis of the data from the sensor 290' or 290'' may be used.

It will be appreciated that the configuration with the X, Y and Z-axis slide mechanisms 225-227 may be highly accurate due to the inclusion of highly accurate X, Y and Z-axis scale sensors 228-230 for each of the slide mechanisms. In various exemplary implementations, the overall position determination within the MCS for each of the corresponding X, Y and Z coordinates may be relatively simple to carry out and highly accurate, due in part to the direct correlation of each X, Y, Z sensor with a single coordinate axis (and a corresponding single coordinate) in the MCS.

Figure 3A:
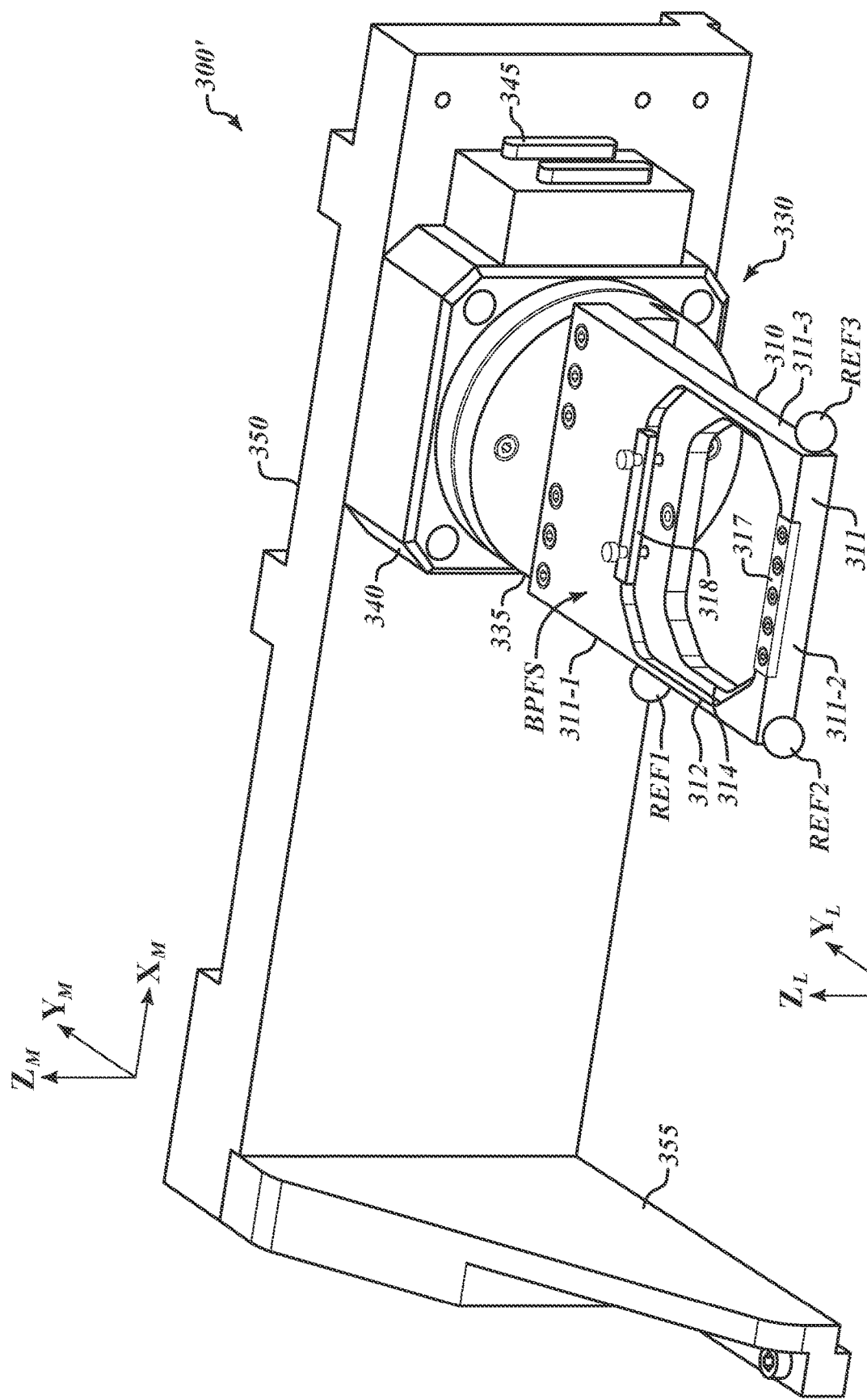
FIGS. 3A-3C are diagrams of a workpiece holding configuration.

As further illustrated in FIG. 2, the control elements of the rotary portion 330 include the rotation mechanism 340 (e.g., a rotary motor which rotates the rotating element 335 of FIG. 3A), and rotary sensors 341 (e.g., which indicate a rotary orientation of the rotating element 335 and workpiece holder 305). The rotary controller 414 provides control signals to the rotary portion 330 (e.g., for rotating the workpiece holder 305), and the rotary data portion 415 receives signals from the rotary portion 330 (e.g., receiving signals from the rotary sensors 341 as indicating the rotary orientation of the rotating element 335 and workpiece holder 305). As will be described in more detail below, the utilization of the reference features REF1, REF2 and REF3 as part of the workpiece holder 305 as disclosed herein enables the precise orientation and position of the workpiece holder 305 and the workpiece WP to be determined (e.g., without requiring precise accuracy of the rotary sensors 341, etc.)

As will be described in more detail below, in various implementations, it may be desirable to measure a workpiece WP in multiple orientations (e.g., for measuring both sides of a workpiece) with a sensing configuration 290 (e.g., including non-contact and/or contact sensors, such as a chromatic range sensor probe 290', a vision probe 290'' or a similar image/vision system, a contact probe 290'' such as a touch probe or scanning probe, etc.) Conventional stationary positioning of a workpiece WP on a stage (e.g., stage 210 of FIG. 1) may present certain challenges for accessing both sides of the workpiece WP, especially for certain sensing configurations and/or sensors. In certain systems, a workpiece may be measured utilizing a calibrated 5-axis system, such as including a 2-axis calibrated rotary stage and a 3-axis cartesian motion system (e.g., for XYZ positioning of the sensing configuration and/or stage). However, such systems (e.g., including a 5-axis stage/motion system and corresponding required calibration, etc.) may result in additional complexity and cost for the metrology system (e.g., including with respect to the machine platform and motion controller, etc.) In various implementations, the configurations disclosed herein (e.g., including a workpiece holder 305) may have particular advantages when utilized with certain types of systems. For example, the rotatable workpiece holder 305 with reference features REF1, REF2 and REF3 as disclosed herein may be utilized with a common and widely utilized cartesian 3-axis metrology system (e.g., with a single or multiple sensors utilized as part of a sensing configuration 290) without requiring or including an articulating probe head (e.g., for which a probe head 213 may not require or include a rotation mechanism 214 or rotary sensor(s) 215, such as those described above with respect to FIG. 2).

Figure 6A:
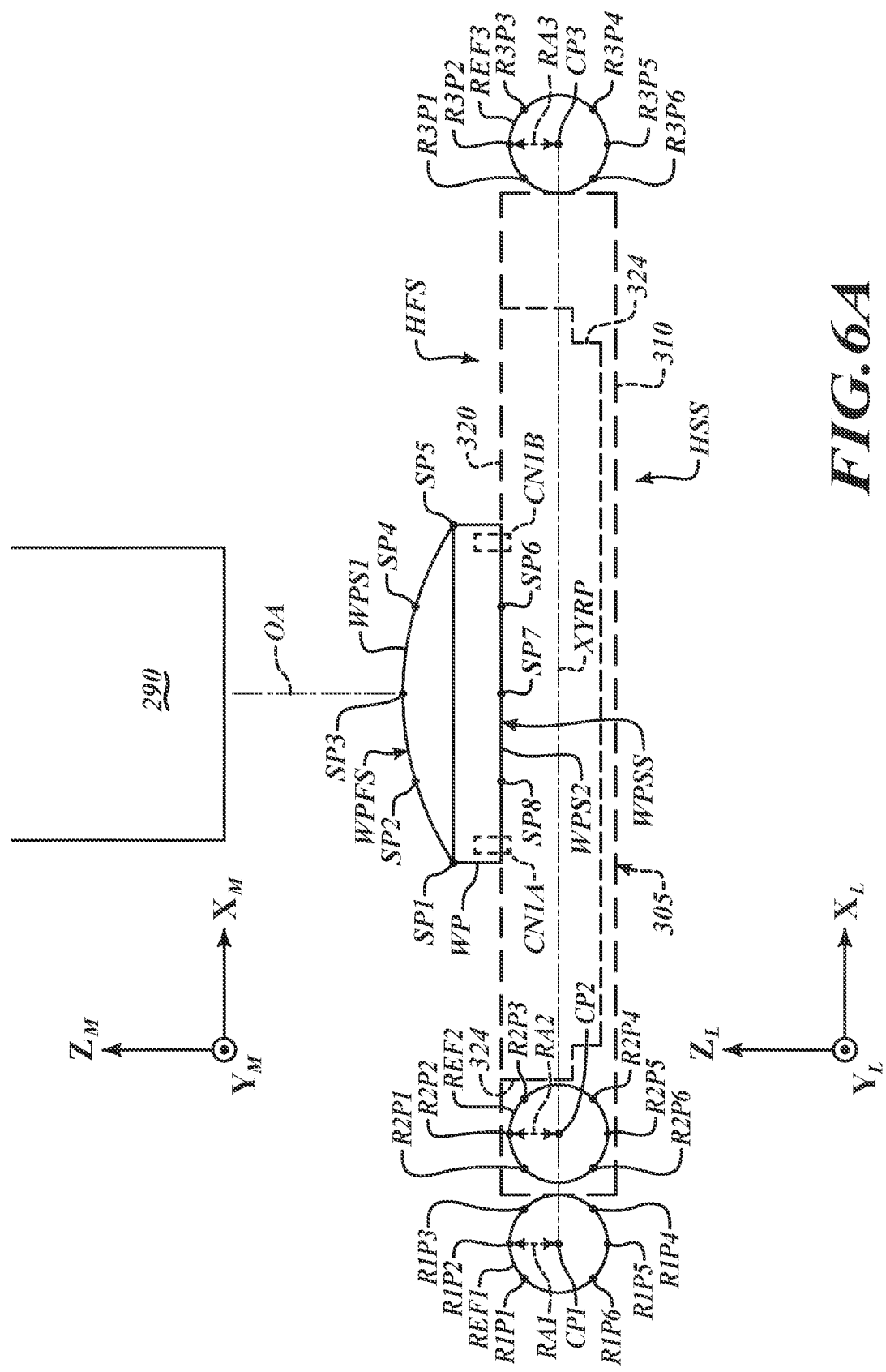
FIGS. 6A-6C are diagrams illustrating a workpiece holder in different orientations relative to a sensing configuration.
Figure 6B:
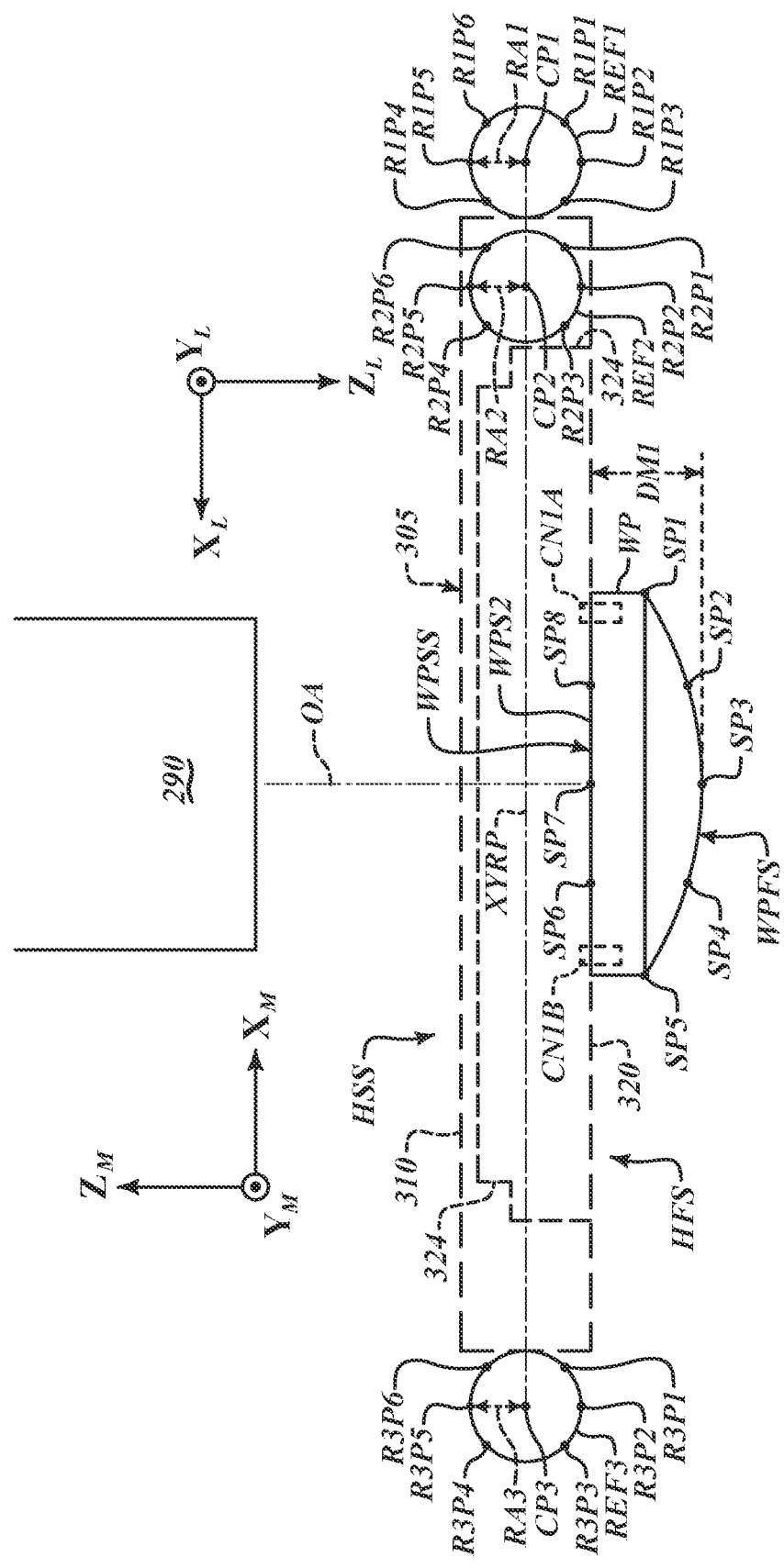
Figure 6C:
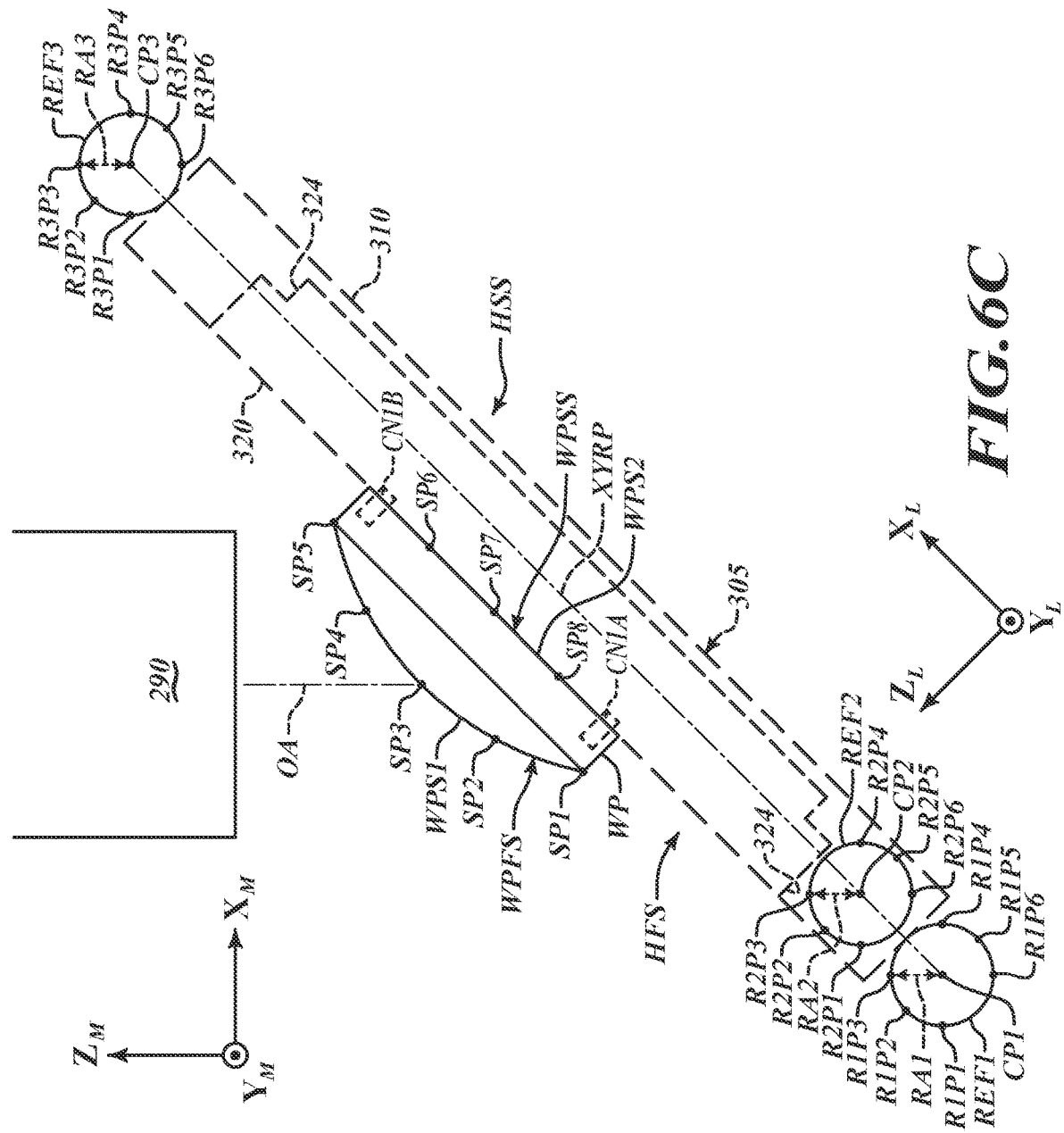

As will be described in more detail below, the workpiece WP (e.g., a lens) that is to be measured may be held by the workpiece holder 305 which can be rotated by the rotary portion 330, so that the sensing configuration 290 can acquire surface data for a first surface on a first side of the workpiece WP (e.g., a front surface of the lens), and then when the workpiece holder 305 is rotated (e.g., by 180 degrees), the sensing configuration 290 can acquire surface data for a second surface on a second side of the workpiece WP (e.g., a back surface of the lens). In various implementations, the reference features REF1, REF2 and REF3 provide reference points (e.g., for a common coordinate system), such that the 3-dimensional surface data for the first surface of the workpiece WP (e.g., a front surface) may be combined with the 3-dimensional surface data for a second surface (e.g., a back surface) of the workpiece WP, as part of a 3-dimensional representation of the workpiece (e.g., that includes the first and second surfaces). As will be described in more detail below, FIGS. 6A, 6B and 6C illustrate a workpiece holder 305 in example rotational orientations of 0 degrees, 180 degrees and 45 degrees (or 315 degrees), respectively. In various implementations, the reference features (e.g., which in some instances may also or alternatively be designated as 3-dimensional reference objects) may be integrated with the workpiece holder 305. In various implementations, each of the reference features REF1, REF2 and REF3 may be a spherical reference feature (e.g., in a form of a full or partial sphere).

With respect to FIG. 2, the processing device configuration 110 includes one or more processors 401 and a memory 402 coupled to the one or more processors which stores program instructions that when executed by the one or more processors cause the one or more processors to perform operations (e.g., for measuring the workpiece WP, etc., such as described in more detail below with respect to FIG. 7, etc.) In various implementations, the workpiece holding configuration 300 is configured to operate in conjunction with the sensing configuration 290 and the processing device configuration 110. The sensing configuration 290 (e.g., including one or more sensors/probes) is configured to obtain 3-dimensional surface data for the workpiece WP. The workpiece holder 305 is configured to hold the workpiece WP, and includes a workpiece holding portion and the reference features REF1, REF2 and REF3. The reference features REF1, REF2 and REF3 are at locations on the workpiece holder 305 (e.g., extending from the sides of the workpiece holder) such that the reference features can be measured/sensed when the workpiece holder 305 is in multiple orientations (e.g., including rotational orientations of 0 degrees, 180 degrees, etc.)

In various implementations, the workpiece holder 305 may include reference features in addition to the reference features REF1, REF2 and REF3. In various implementations, some or all of the reference features may be in the form of 3-dimensional reference objects, such as spherical reference features (e.g., formed as at least partial or full spheres), as illustrated by the examples of FIGS. 3A-3C and 6A-6C. In various implementations, some or all of the reference features may be in other forms (e.g., ring gauges or holes, such as in the workpiece holder, or optical targets, etc.) In accordance with principles disclosed herein, in various implementations it may generally be desirable that at least some of the reference features be configured to be sensed by the sensing configuration when the workpiece holder is in different orientations (e.g., for which a 3-dimensional position of a center point or other point of the reference feature may be determined when the workpiece holder is in the different orientations, so as to enable a combining of the surface data for the workpiece that is measured and/or otherwise obtained in each orientation).

It will be appreciated that in some implementations, certain symmetrical features or characteristics of a reference feature may enable a center point of the reference feature to be determined from multiple orientations. For example, for certain reference features (e.g., spherical reference features), surface points that are determined on different portions of the surface of the reference feature, from different orientations, may be utilized to determine a 3-dimensional position of a center point CP of the reference feature (e.g., such as with regard to a known radius RA from the center point CP to each of the surface points, as will be described in more detail below with respect to FIGS. 6A-6C).

As will be described in more detail below with respect to FIGS. 4A and 4B, in various implementations, the workpiece holding portion (e.g., which may be inserted and secured in the workpiece holder 305 and/or otherwise included as part of the workpiece holder 305) includes workpiece engaging portions (e.g., which contact the workpiece and may include kinematic or semi-kinematic features). Each workpiece engaging portion is configured to engage the workpiece WP so that the workpiece engaging portions (e.g., in cooperation with one another) securely hold the workpiece WP in the workpiece holder 305. As will be described in more detail below with respect to FIG. 5, in various implementations the workpiece engaging portions may comprise pneumatic engaging portions which utilize pneumatic (e.g., vacuum) features for engaging the workpiece WP. As will be described in more detail below, in various implementations different interchangeable workpiece holding portions may be provided which may be interchanged to be inserted in the workpiece holder 305 and may have different interior characteristics (e.g., for holding different sized and/or shaped workpieces for inspection/ measurement by the metrology system 10).

In general, the reference features REF1, REF2 and REF3 (e.g., see FIG. 2) are each configured to be sensed by the sensing configuration 290, both when the workpiece holder 305 is in a first orientation (e.g., in which a first side of the workpiece holder 305 faces toward the sensing configuration 290 and a second side of the workpiece holder 305 faces away from the sensing configuration 290), and when the workpiece holder 305 is rotated (e.g., by the rotary portion 330) to be in a second orientation (e.g., in which the second side of the workpiece holder 305 faces toward the sensing configuration 290 and the first side of the workpiece holder 305 faces away from the sensing configuration 290). As an example, in one implementation the workpiece holder 305 may be rotated by approximately 180 degrees from the first orientation to the second orientation, for presenting first and second sides (e.g., front and back sides), respectively, of the workpiece WP to be measured by the sensing configuration 290.

In various implementations, the metrology system 10 may utilize only a single sensor (e.g., sensor 290', 290", or 290''') or may utilize multiple such sensors (e.g., sequentially or simultaneously, utilizing different types of such non-contact and/or contact sensors). In various implementations, multiple sensors may be available in a changing rack (not shown) of the metrology system 10, from which such sensors may each be selected to be attached to the movement mechanism configuration 220 as part of the sensing configuration 290, or in a configuration in which multiple such sensors may be simultaneously attached to the movement mechanism configuration 220 and utilized as part of the sensing configuration 290 for obtaining 3-dimensional surface data for the workpiece.

In various implementations, as part of the sensing configuration 290, only a single sensor, or each sensor of multiple sensors may be operated to obtain 3-dimensional reference feature data for determining first 3-dimensional positions of the reference features REF1, REF2 and REF3 while the workpiece holder 305 is in the first orientation (e.g., in which a first side of the workpiece holder and/or workpiece faces toward the sensing configuration, which in some implementations may correspond to the first side facing upward, and the second side of the workpiece holder and/or workpiece faces away from the sensing configuration, which in some implementations may correspond to the second side facing downward). In various implementations, the 3-dimensional reference feature data may comprise 3-dimensional reference feature surface data corresponding to surface points on surfaces of the reference features. As will be described in more detail below with respect to FIGS. 6A-6C, in various implementations, for each reference feature, a distance between each point on the surface of the reference feature and a center point of the reference feature may be equal to a radius of the reference feature, and the determining of the 3-dimensional position of the reference feature may comprise determining the 3-dimensional position of the center point of the reference feature.

The workpiece WP is measured while the workpiece holder 305 is in the first orientation, for which in various implementations the measuring of the workpiece may be performed after the reference features REF1, REF2 and REF3 are measured, or in some instances may be measured simultaneously or before the reference features REF1, REF2 and REF3 are measured. In any case, as an example, the sensing configuration 290 may be operated to obtain first 3-dimensional surface data (e.g., for a first side of the workpiece) while the workpiece holder 305 is in the first orientation. As described above, in various implementations only a single sensor, or each sensor of multiple sensors may be operated to each obtain first 3-dimensional surface data for the workpiece WP while the workpiece holder 305 is in the first orientation.

In various implementations, the workpiece holder 305 may then be rotated to be in a second orientation. For example, such a rotation may nominally correspond to a 180 degree rotation or other amount of rotation (e.g., as rotated around an axis of rotation that may be horizontal and/or perpendicular to a z-axis direction of the machine coordinate system and/or perpendicular to an optical axis OA of the sensing configuration 290, or as may have a different orientation). In various implementations, such rotation may be performed or otherwise achieved through utilization of the rotary portion 330 and/or a user may manually rotate and/or place the workpiece holder 305 to be in the second orientation.

In various implementations, as part of the sensing configuration 290, only a single sensor, or each sensor of multiple sensors may be operated to obtain 3-dimensional reference feature data for determining second 3-dimensional positions of the reference features REF1, REF2 and REF3 while the workpiece holder is in the second orientation (e.g., in which a second side of the workpiece holder and/or workpiece faces toward the sensing configuration, which in some implementations may correspond to the second side facing upward, and the first side of the workpiece holder and/or workpiece faces away from the sensing configuration, which in some implementations may correspond to the first side facing downward). As described above, in various implementations only a single sensor, or each sensor of multiple sensors may be operated to obtain 3-dimensional reference feature data for determining second 3-dimensional positions of the three reference features REF1, REF2 and REF3 while the workpiece holder is in the second orientation.

The workpiece WP is also measured while the workpiece holder 305 is in the second orientation, for which in various implementations the measuring of the workpiece WP may be performed after the reference features REF1, REF2 and REF3 are measured, or in some instances may be measured simultaneously or before the reference features REF1, REF2 and REF3 are measured. In any case, in various implementations as part of the sensing configuration 290, only a single sensor, or each sensor of multiple sensors, may be operated to obtain second 3-dimensional surface data (e.g., for a second side of the workpiece) while the workpiece holder 305 is in the second orientation.

In various implementations, in addition to first and second orientations, the workpiece holder 305 may be rotated to additional orientations (e.g., third, fourth, etc.), wherein as part of the sensing configuration 290, in various implementations only a single sensor, or each sensor of multiple sensors may be operated to obtain 3-dimensional reference feature data for determining 3-dimensional positions of the reference features REF1, REF2 and REF3, and to obtain 3-dimensional surface data for the workpiece, for each of the additional orientations. In general, while certain orientations of the workpiece holder 305 are illustrated in FIGS. 1, 3A, 3C, 6A and 6B (e.g., such as a first orientation corresponding to a rotational orientation of approximately 0 degrees and a second orientation corresponding to a rotational orientation of approximately 180 degrees), it will be appreciated that alternative or additional rotational orientations may be utilized in various implementations (e.g., an orientation corresponding to a rotation of approximately 45 degrees, as illustrated in FIG. 6C, or other orientation, such as with a desired angle between an optical axis OA of the sensing configuration 290 and an angled workpiece surface, etc.)

As will be described in more detail below, various implementations, a rigid body transformation or other transformation or operation may be applied to the 3-dimensional surface data for the workpiece WP based at least in part on the 3-dimensional positions of the reference features REF1, REF2 and REF3. In various implementations, the rigid body transformation that is applied may be a type of rigid transformation (e.g., which in some instances may also be referenced as an Euclidean transformation or Euclidean isometry) that is a geometric transformation of a Euclidean space that preserves the Euclidean distance between every pair of points (e.g., between the points on a surface of the workpiece and the center points of the reference features), and for which a representation of an object (e.g., a workpiece) and/or parts thereof will keep the same shape and size after a rigid transformation (e.g., such as preserving a distance and orientation of a first workpiece surface relative to a second workpiece surface).

For example, the first 3-dimensional surface data for the workpiece may comprise 3-dimensional positions of surface points on the first surface of the workpiece, and for which the 3-dimensional position of each surface point may be related (e.g., by coordinates, distance, etc.) to the first 3-dimensional positions (e.g., corresponding to center points) of the reference features REF1, REF2 and REF3. Similarly, the second 3-dimensional surface data for the workpiece may comprise 3-dimensional positions of surface points on the second surface of the workpiece, and for which the 3-dimensional position of each surface point may be related (e.g., by coordinates, distance, etc.) to the second 3-dimensional positions (e.g., corresponding to center points) of the reference features REF1, REF2 and REF3. Thus, by performing a transformation (e.g., a rigid body transformation) or other operation in which the first and second 3-dimensional positions of the reference features REF1, REF2 and REF3 are aligned, and for which the transformation or other operation may maintain the relative positions of all of the surface points of the workpiece WP relative to the positions of the reference features REF1, REF2 and REF3, the first and second 3-dimensional surface data for the workpiece may be combined (e.g., in a common coordinate system as part of a 3-dimensional representation of the workpiece WP which includes the first and second workpiece surfaces, etc.).

In various implementations, in a configuration where multiple sensors are utilized (e.g., as part of the operations of the sensing configuration 290 and/or metrology system 10 for measuring the workpiece WP), the reference features REF1, REF2 and REF3 may also be utilized to align the coordinate systems for the measurements by the multiple sensors (e.g., sensors 290', 290", and/or 290''', etc.) For example, when the workpiece holder 305 is in a first orientation, a first sensor (e.g., sensor 290' of FIG. 2) may be utilized to obtain 3-dimensional reference feature data for determining 3-dimensional positions of the reference features REF1, REF2 and REF3 and to obtain 3-dimensional surface data for the workpiece WP, and a second sensor (e.g., sensor 290" or sensor 290''' of FIG. 2) may also be utilized to obtain 3-dimensional reference feature data for determining 3-dimensional positions of the reference features REF1, REF2 and REF3 and to obtain 3-dimensional surface data for the workpiece WP.

By aligning (e.g., in a common coordinate system) the 3-dimensional positions of the reference features REF1, REF2 and REF3 as determined according to the data from the first sensor with the 3-dimensional positions of the reference features REF1, REF2 and REF3 as determined according to the data from the second sensor, the respective local coordinate systems (e.g., for the workpiece holder/workpiece, which may correspond to the local coordinate systems for the measurements by the respective sensors) may be aligned. Alternatively or in addition, a similar process may be performed with respect to the data from the sensors (e.g., and for aligning the local coordinate systems) when the workpiece holder 305 is in the second orientation, etc. and/or for which a rigid body transformation and/or other transformation or process may be performed for combining all of the 3-dimensional surface data for the workpiece WP. In various implementations, one or more of the reference features REF1, REF2 and REF3 may also be utilized for realignment and/or calibration of the metrology system 10 and/or coordinate measuring machine 100. For example, certain calibration processes that may be performed are described in U.S. Pat. No. 8,229,694, which is hereby incorporated herein by reference in its entirety.

While FIGS. 1 and 2 illustrate examples including a coordinate measuring machine 100, it will be appreciated that in other implementations, a metrology system may include alternative types of measuring machines that may be utilized with the workpiece holding configuration 300 and/or workpiece holder 305 (e.g., such as a vision measuring machine, a machine vision inspection system, etc.), for which similar or identical operations may be performed as described herein.

Figure 3B:
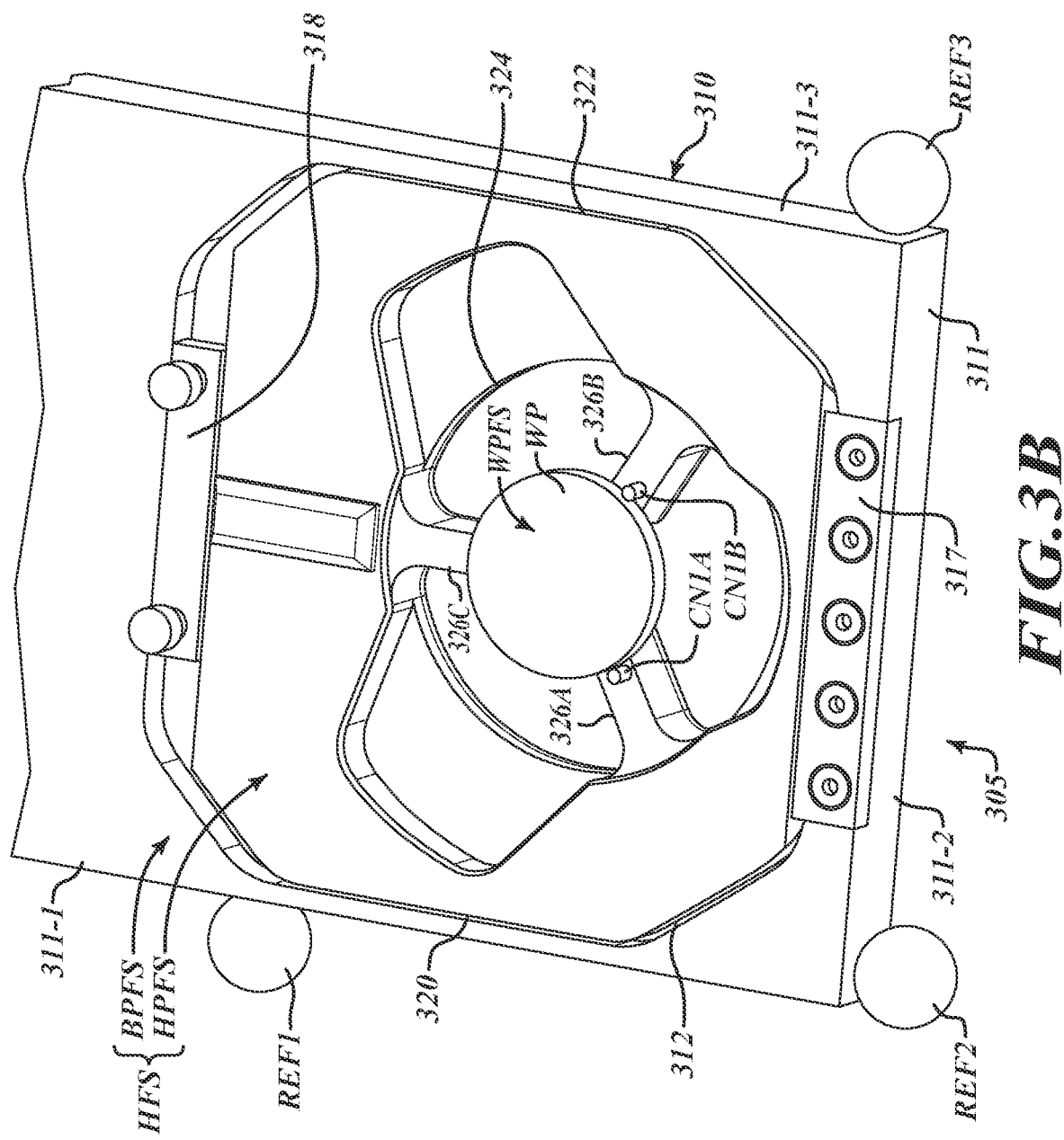
Figure 3C:
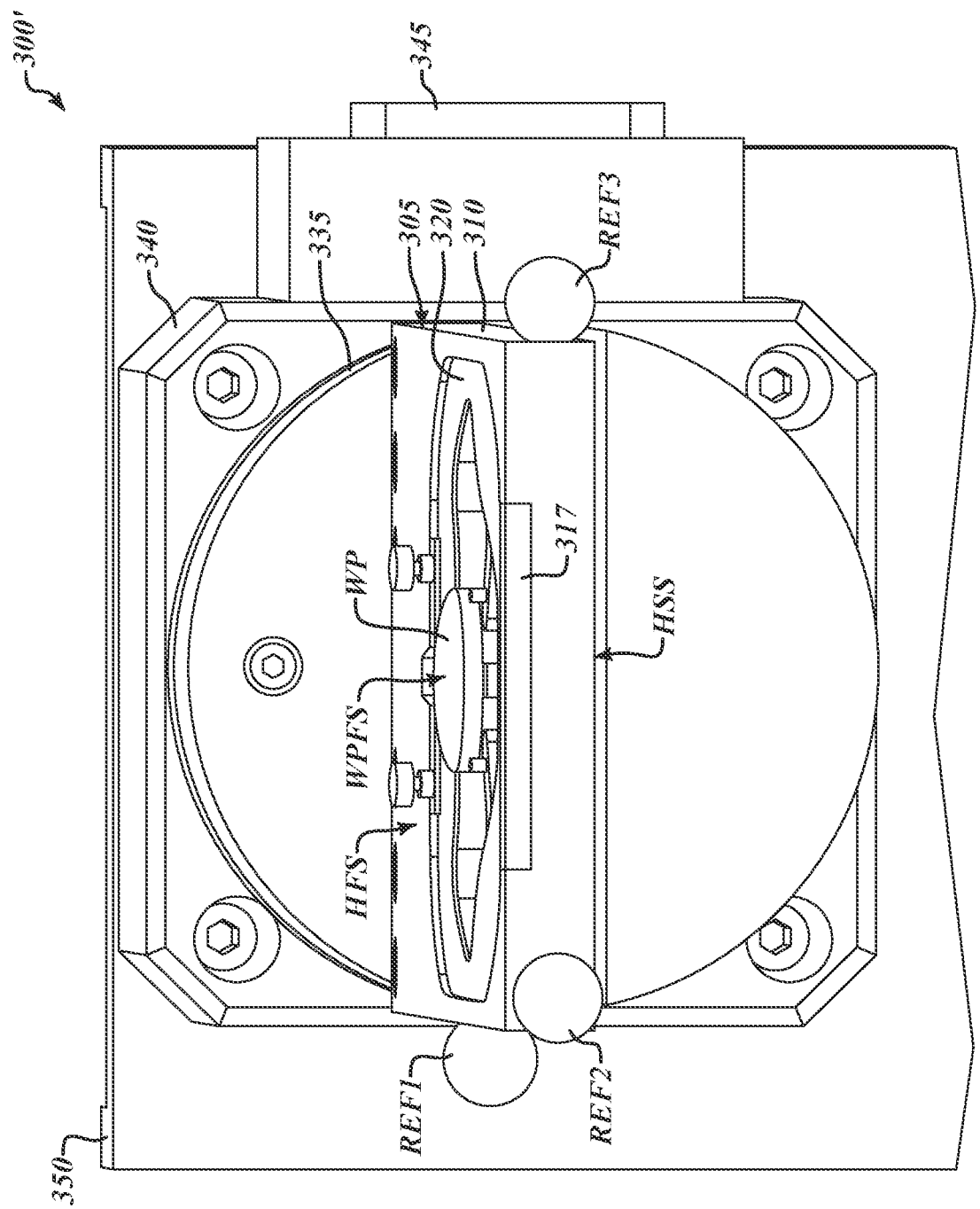

FIGS. 3A-3C are diagrams of elements of a workpiece holding configuration, such as the workpiece holding configuration 300 of FIG. 1. As illustrated in FIGS. 3A-3C, and with reference to FIG. 1, in various implementations, the workpiece holding configuration is provided for utilization in a metrology system 10. In various implementations, the workpiece holding configuration (e.g., for which a partial workpiece holding configuration 300' is illustrated in FIG. 3A, with remaining portions of the workpiece holding configuration 300, including a workpiece holding portion 320, illustrated in FIGS. 3B and 3C) includes a workpiece holder 305 which comprises a workpiece holding portion 320 (FIGS. 3B and 3C) and reference features REF1, REF2 and REF3. As will be described in more detail below with respect to FIGS. 4A and 4B, the workpiece holding portion 320 comprises a plurality of workpiece engaging portions, wherein each workpiece engaging portion is configured to engage a portion of the workpiece WP to securely hold the workpiece WP in the workpiece holder 305. The reference features REF1, REF2 and REF3 are each configured to be sensed by the sensing configuration 290 of the metrology system 10 in multiple orientations of the workpiece holder 305 (e.g., including when the workpiece holder 305 is in a first orientation and when the workpiece holder 305 is rotated to be in a second orientation, as will be described in more detail below).

As illustrated in FIGS. 3B and 3C, the workpiece holder 305 includes a body portion 310 and the workpiece holding portion 320. As illustrated in FIG. 3A, the body portion 310 is coupled to a rotating element 335 of the rotary portion 330. The rotary portion 330 includes the rotating element 335, a rotation mechanism 340 (e.g., a rotary motor which rotates the rotating element 335), and an electronics portion 345. The electronics portion 345 may receive power and/or control signals from a controller (e.g., rotary controller 414 of FIG. 2), and may provide rotary data signals (e.g., from rotary sensors 341 to rotary data portion 415 of FIG. 2), which may indicate the rotary orientation of the rotating element 335 and workpiece holder 305. The rotary portion 330 is coupled to and supported by a support portion 350, which may be coupled to and supported by an additional support portion 355. In various implementations, the rotary portion 330 may rotate the workpiece holder 305 around a horizontal axis (e.g., as will be described in more detail below with respect to FIG. 5). In various implementations, the workpiece holder 305 may be rotated by approximately 180 degrees from the first orientation to be in the second orientation (e.g., as will be described in more detail below with respect to the examples of FIGS. 6A and 6B).

In various implementations, the reference features REF1, REF2 and REF3 (e.g., illustrated as spheres) may be located on or otherwise extend from edge portions 311-1, 311-2 and 311-3, respectively, of an outer edge 311 of the body portion 310 (e.g., which in some instances may be referenced as a frame portion 310 or an outer portion 310). As further illustrated in FIG. 3A, the body portion 310 may further include a first central aperture 312, for which as illustrated in FIG. 3B the workpiece holding portion 320 may have an outer boundary 322 with a shape and size that is configured to fit within the first central aperture 312 such that the workpiece holding portion 320 is configured to fit and be secured to and within the body portion 310. Securing portions 317 and 318 (e.g., including adjustable bolts and plates and/or other fastening mechanisms) may be utilized for securing (e.g., clamping, etc.) the workpiece holding portion 320 within the first central aperture 312 of the body portion 310. The body portion 310 also includes a second central aperture 314 (FIG. 3A), which in conjunction with a central aperture 324 of the workpiece holding portion 320 (FIG. 3B), provides a combined aperture/opening which allows a second side of the workpiece WP (e.g., including a second workpiece surface WPSS) to be viewed and sensed by the sensing configuration 290 (e.g., when the workpiece holder 305 is in a second orientation relative to the sensing configuration 290, as will be described in more detail below with respect to the example of FIG. 6B).

As illustrated in FIG. 3B, in various implementations, workpiece engaging portions (e.g., including workpiece engaging portions CN1A and CN1B, as well as other workpiece engaging portions illustrated in FIGS. 4A and 4B which will be described in more detail below) may each engage (e.g., physically contact or otherwise operate to hold or restrain) a respective portion of the workpiece WP such that the workpiece engaging portions rigidly/securely hold the workpiece WP in the workpiece holder 305. In various implementations, support portions 326A, 326B and 326C may extend radially inward from an edge of the central aperture 324 of the holding portion 320 and may include and/or support one or more workpiece engaging portions for engaging a workpiece WP, as will be described in more detail below with respect to FIGS. 4A and 4B. In various implementations, support portions may also or alternatively extend inward in a non-radial manner. In addition, it will be appreciated that while three support portions are illustrated in various example implementations herein, fewer or more support portions may be utilized in various alternative implementations (e.g., to increase/adjust the stability, holding force, etc. for holding the various workpieces).

As further illustrated in FIG. 3B, a workpiece holder first side HFS (i.e., on a first side of the workpiece holder 305) may include a body portion first side BPFS (i.e., on a first side of the body portion 310) and a workpiece holding portion first side HPFS (i.e., on a first side the workpiece holding portion 320). As will be described in more detail below, in various implementations, a workpiece holder second side HSS (i.e., on a second side of the workpiece holder 305) may include a body portion second side BPSS (i.e., on a second side of the body portion 310) and a workpiece holding portion second side HPSS (i.e., on a second side of the workpiece holding portion 320). Similarly, a workpiece WP that is held in the workpiece holder 305 may include a workpiece first side WPFS (i.e., on a first side of the workpiece WP) and a workpiece second side WPSS (i.e., on a second side of the workpiece WP).

In the illustration of FIG. 3A, a local coordinate system (i.e., associated with the workpiece holder 305 and/or workpiece WP as will be described in more detail below) includes orthogonal $X_L$, $Y_L$ and $Z_L$ axes and in the first orientation as illustrated in FIG. 3A is nominally aligned with the machine coordinate system (e.g., of the metrology system 10 and/or measuring machine 100) which includes the orthogonal $X_M$, $Y_M$ and $Z_M$ axes. As will be described in more detail below, in other orientations (e.g., as illustrated in the examples of FIGS. 6B and 6C), the local coordinate system may not be aligned with the machine coordinate system (e.g., once the workpiece holder 305 has been rotated to orientations other than the 0 degree orientation illustrated in FIG. 3A).

As will be described in more detail below, in the first orientation (e.g., as illustrated in FIGS. 3A and 3C), the sensing of the reference features REF1, REF2 and REF3 by the sensing configuration 290 (e.g., see FIGS. 1 and 6A) enables first 3-dimensional positions (e.g., within the machine coordinate system) of the reference features REF1, REF2 and REF3 to be determined. In the first orientation, the first side WPFS of the workpiece WP that is held by the workpiece holder 305 is oriented so as to enable the sensing configuration 290 to obtain first 3-dimensional surface data for a first surface on the first side WPFS of the workpiece. In the second orientation (e.g., see FIG. 6B), the sensing of the reference features REF1, REF2 and REF3 by the sensing configuration 290 enables second 3-dimensional positions (e.g., within the machine coordinate system) of the reference features REF1, REF2 and REF3 to be determined. In the second orientation, a second side WPSS of the workpiece that is held by the workpiece holder 305 is oriented so as to enable the sensing configuration 290 to obtain second 3-dimensional surface data for a second surface on the second side WPSS of the workpiece. The determined first and second 3-dimensional positions of the reference features REF1, REF2 and REF3 enables a combining of the first 3-dimensional surface data for the workpiece WP with the second 3-dimensional surface data for the workpiece WP (e.g., as part of a 3-dimensional representation of the workpiece WP).

Figure 4A:
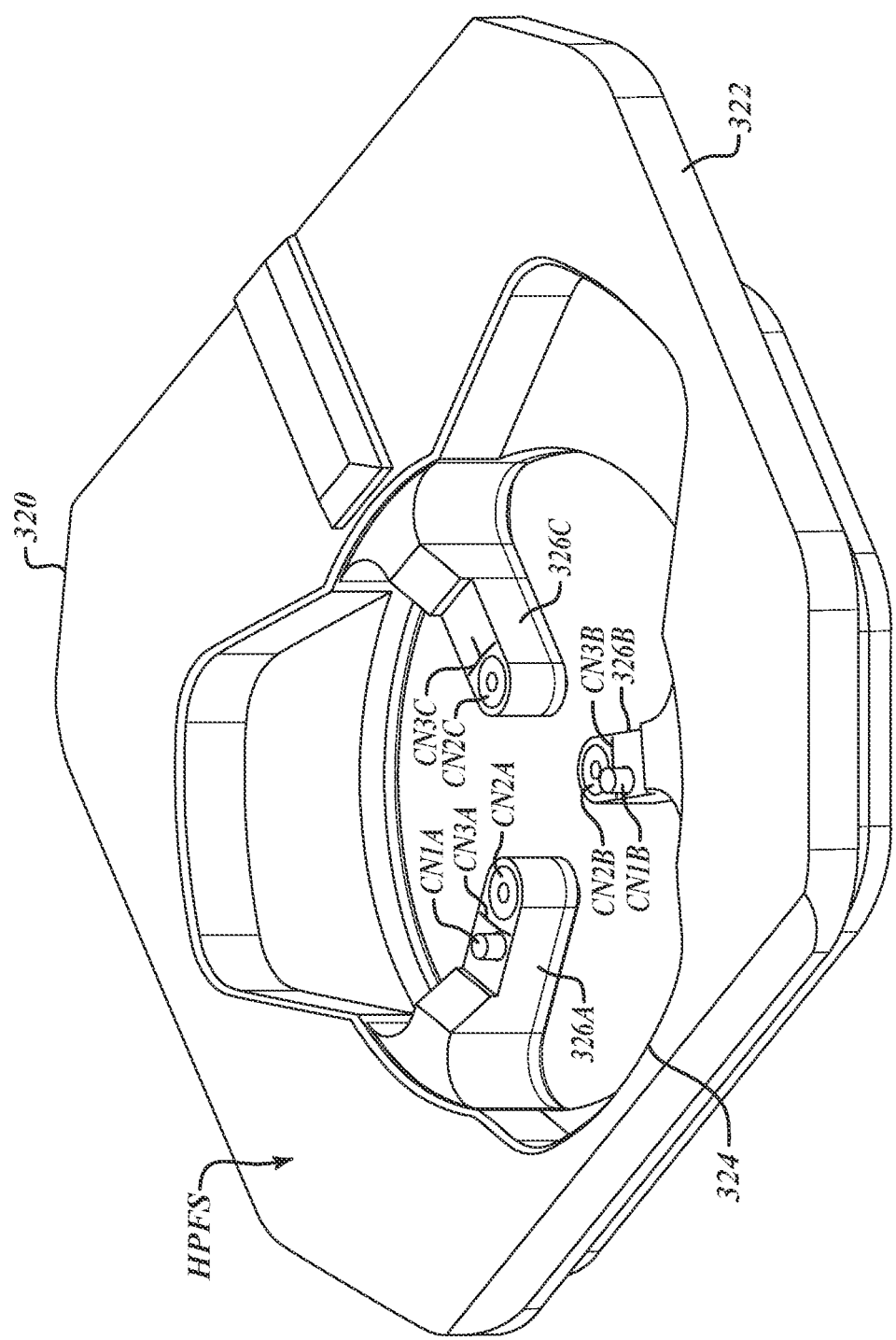
FIGS. 4A and 4B are diagrams of implementations of a workpiece holding portion.

FIG. 4A is a diagram of a first implementation of a workpiece holding portion 320. As illustrated in FIG. 4A, the workpiece holding portion 320 includes workpiece engaging portions CN1A-CN1B, CN2A-CN2C and CN3A-CN3C. In various implementations, the workpiece engaging portions CN1A and CN1B may include posts or other support portions against which a portion of the workpiece may rest or otherwise be secured. In various implementations, the workpiece engaging portions CN2A, CN2B and CN2C may comprise soft vacuum gasket pads and/or other features for engaging the workpiece WP (e.g., for which an example corresponding vacuum/pneumatic system will be described in more detail below with respect to FIG. 5). In various implementations, the workpiece engaging portions CN3A, CN3B and CN3C may include indentations (e.g., against which certain edge portions of the workpiece WP may rest) in the support portions 326A, 326B and 326C which extend radially inward from an edge of a central aperture 324 of the holding portion 320 (e.g., for which the support portions 326A-326C may also support the workpiece engaging portions CN1A-CN1B and CN2A-CN2C).

Figure 4B:
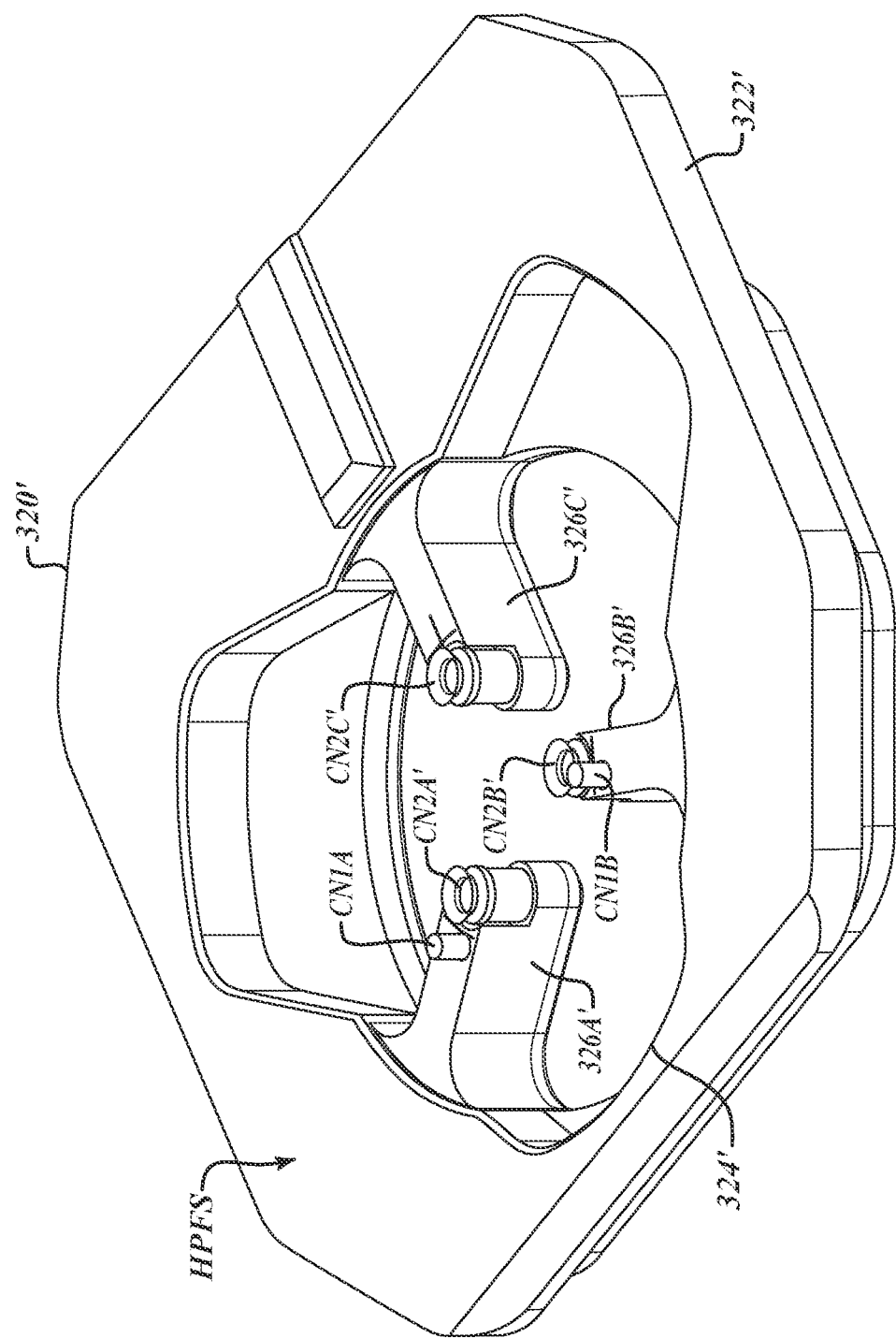

FIG. 4B is a diagram of a second implementation of a workpiece holding portion 320'. It will be appreciated that certain numbered components 3XX' of FIG. 4B may correspond to and/or have similar operations as similarly numbered counterpart components 3XX of FIG. 4A, and may be understood by analogy thereto, except as otherwise described below. This numbering scheme to indicate elements having analogous design and/or function (i.e., unless otherwise illustrated and/or described) is also applied elsewhere herein (e.g., including FIG. 5, etc.) As illustrated in FIG. 4B, the workpiece holding portion 320' includes support portions 326A'-326C' which support workpiece engaging portions CN1A-CN1B and CN2A'-CN2C'. In various implementations, the workpiece engaging portions CN2A'-CN2C' may comprise bellows-style vacuum cups or other elements configured to support and retain or otherwise engage portions of a workpiece (e.g., for which an example corresponding vacuum/pneumatic system will be described in more detail below with respect to FIG. 5).

In various implementations, a workpiece WP may initially be placed or otherwise positioned (e.g., by a user) to be secured within or otherwise by the workpiece holding portion (e.g., workpiece holding portion 320 or 320') of the workpiece holder 305. For example, for the workpiece holding portion 320, the workpiece engaging portions (e.g., workpiece engaging portions CN1A-CN1B, CN2A-CN2C and/or CN3A-CN3C) may each engage (e.g., physically contact or otherwise operate to hold) a respective portion (e.g., on a second or back surface on a second or back side, etc.) of the workpiece WP such that the workpiece engaging portions securely hold the workpiece WP. In some implementations, certain engaging portions (e.g., engaging portions CN2A-CN2C and/or CN2A'-CN2C') may engage and hold the respective portions of the workpiece at least in part through operation of an associated workpiece engaging system (e.g., a pneumatic/vacuum system as will be described in more detail below with respect to FIG. 5), for which the respective system may be turned on or otherwise operated (e.g., to start applying vacuum pressure, etc.) either before or after the workpiece is placed in the workpiece holding portion of the workpiece holder 305. In general, in various implementations a workpiece holding portion may include various kinematic or semi-kinematic features (e.g., such as engaging portions CN2A-CN2C and/or CN2A'-CN2C', etc.) for holding a workpiece.

In various implementations, a plurality of additional workpiece holding portions (e.g., with certain similarities to workpiece holding portions 320 and 320') may be provided as part of a metrology system 10. Each workpiece holding portion may have an outer boundary with a similar shape and size as the outer boundary 322 and/or 322' of the workpiece holding portion 320 and/or 320', such that the workpiece holding portions may be interchangeable in that each workpiece holding portion is configured to be interchanged to fit within the first central aperture 312 and be secured within the body portion 310 of the workpiece holder 305. In various implementations, each workpiece holding portion may comprise a plurality of workpiece engaging portions for engaging a workpiece WP, and for which each workpiece holding portion of the plurality of workpiece holding portions may be configured to hold a workpiece WP of a different size and/or shape. As an example, a workpiece holding portion 320" of FIG. 5 is illustrated in a bottom view (i.e., also illustrating a channel 329) with an interior portion including relatively shorter support portions 326A"-326C" for supporting workpiece engaging portions (e.g., similar to those of workpiece holding portion 320 or 320') which are configured to hold a larger workpiece as compared to the workpiece holding portions 320 and 320'.

It will be appreciated that such interchangeable workpiece holding portions may provide various advantages. For example, rather than requiring different entire workpiece holders 305 for accommodating workpieces with different properties (e.g., different sized and/or shaped workpieces), a single workpiece holder 305 may be utilized that can receive interchangeable workpiece holding portions 320 (e.g., which may each be configured with different properties/features, such as different workpiece engaging portions and/or for holding workpieces of different sizes and/or shapes, etc.) Such configurations may be more economical (i.e., producing different interchangeable workpiece holding portions 320 may be less expensive than producing different entire workpiece holders 305), and may save time (e.g., in various implementations, interchanging workpiece holding portions 320 may be performed more quickly than a process required for interchanging an entire workpiece holder 305 for each different workpiece that is to be measured). In various implementations, certain workpiece holding portions 320 may be fabricated through utilization of additive manufacturing, such as 3-dimensional printing, etc. (e.g., as may be fabricated by users for holding workpieces of different shapes and/or sizes, etc.) In various implementations, certain standard workpiece holding portions 320 (e.g., which may be characterized as "blanks") that can be further modified or adjusted may be provided (e.g., which users may customize or otherwise modify, such as with machining processes or otherwise, to be configured to hold workpieces of certain sizes and/or shapes, etc.) In some implementations, a workpiece holder and/or workpiece holding portion may be provided with adjustable features (e.g., with support portions 326 having adjustable dimensions, orientations, and/or other features) for holding workpieces of different sizes and/or shapes, etc.

In various implementations, a workpiece holding portion may be made to include one or more reference features similar to the reference features REF1, REF2 and/or REF3 (e.g., in addition to or as an alternative to the reference features REF1, REF2 and/or REF3 as illustrated as being included on the body portion 310 in FIGS. 3A-3C and 6A-6C). In various implementations, various calibration or alignment features may be included on the workpiece holding portion 320 and/or body portion 310 of the workpiece holder 305 (e.g., as may be utilized for alignment or calibration operations to be performed in relation to or as part of measurement operations and/or general system calibration or alignment, etc.)

Figure 5:
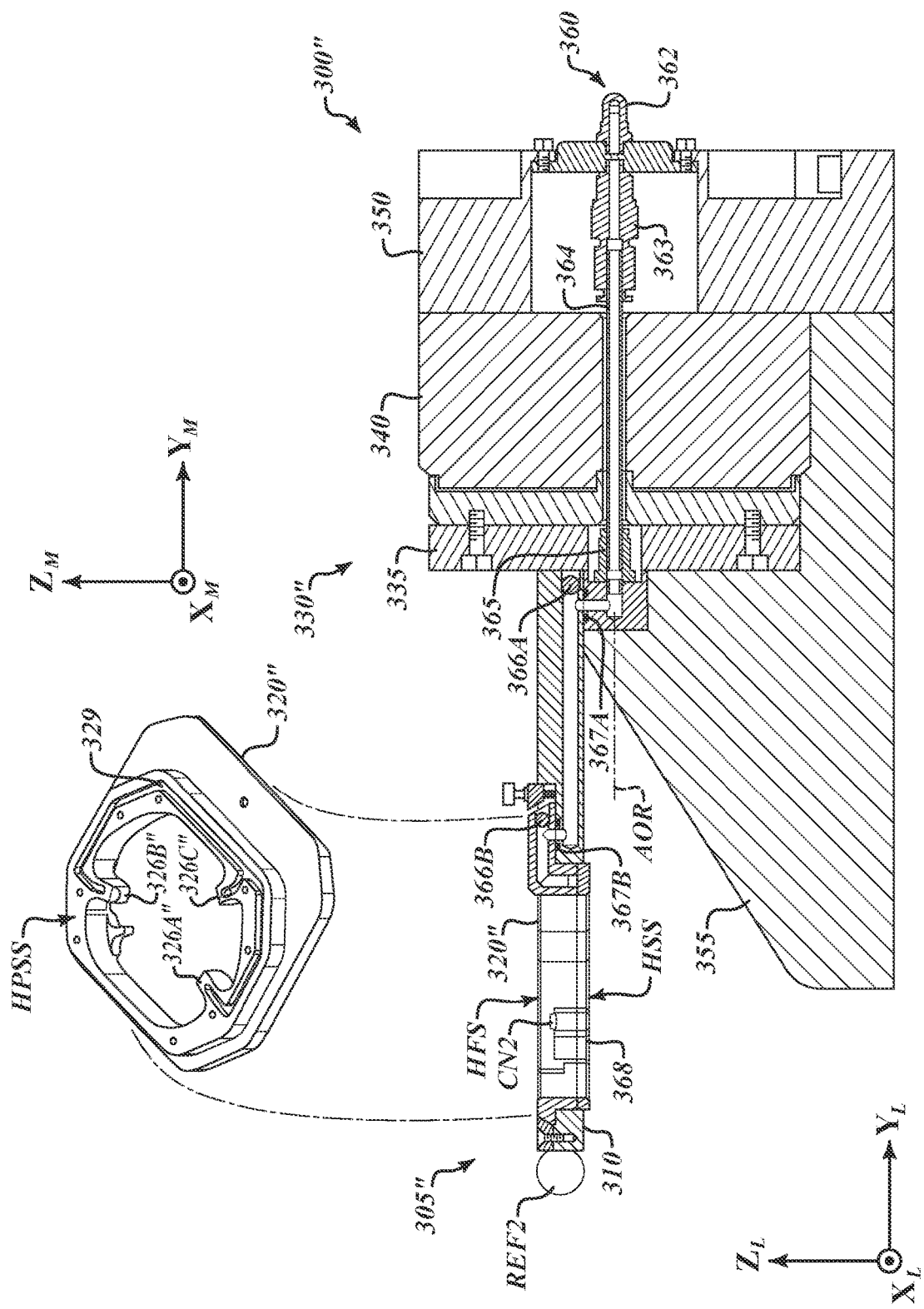
FIG. 5 is a diagram of a workpiece holding configuration as including pneumatic components.

FIG. 5 is a diagram of a workpiece holding configuration 300″ as including certain pneumatic components. At least some of the pneumatic components are part of an associated workpiece engaging system 360 (e.g., a pneumatic system), for which certain portions are illustrated in FIG. 5. In the example of FIG. 5, the workpiece engaging system 360 includes a source portion 362, a swivel portion 363, a tubing portion 364, a tube fitting portion 365, bearings portions 366A and 366B, sealing portions 367A and 367B, a plate portion 368, a vacuum channel portion 329, and a plurality of vacuum cup portions (e.g., vacuum cup portions CN2). In various implementations, the source portion 362 may be configured to be coupled to a vacuum source (e.g., for providing vacuum suction for the workpiece engaging system 360). The swivel portion 363 may comprise a 360° swivel fitting for enabling rotation of certain components (e.g., including a tubing portion 364) as coupled to the workpiece holder 305 for when the workpiece holder 305 is rotated by the rotary portion 330″. The vacuum suction is provided from the source portion 362 through the tubing portion 364 and the coupled tube fitting portion 365 which may be a pneumatic tube fitting.

The bearing portions 366A and 366B may be pressed in bearings and the sealing portions 367A and 367B may include O-ring interfaces or other sealing elements for sealing the vacuum system at the associated coupling interfaces. The plate portion 368 may be a vacuum sealing plate coupled to and/or part of the workpiece holder second side HSS. As illustrated in a bottom view of the workpiece holding portion second side HPSS (i.e., of the workpiece holding portion 320″), the workpiece holding portion second side HPSS may include a vacuum channel 329 for providing the vacuum suction to the workpiece engaging portions (e.g., including workpiece engaging portion CN2) which may include vacuum cups or pads and/or other elements for engaging and securely holding a workpiece. As also illustrated in the bottom view, the workpiece holding portion 320″ includes support portions 326A″-326C″ (e.g., which may be shorter than the support portions 326A-326C and 326A'-326C' of FIGS. 4A and 4B) for supporting workpiece engaging portions (e.g., including the workpiece engaging portion CN2 which may be similar to a workpiece engaging portion of workpiece holding portion 320 or 320') which are configured to hold a workpiece (e.g., which may be a larger and/or differently shaped workpiece as compared to the workpieces that the workpiece holding portions 320 and 320' are configured to hold).

The workpiece holder 305″ includes the body portion 310 and the workpiece holding portion 320″, and may be rotated by the rotary portion 330″. As described above, the rotary portion 330″ may include the rotating element 335 that is coupled to the body portion 310 and which is rotated by the rotation mechanism 340 (e.g., a rotary motor) which is supported by support portions 350 and 355. In various implementations, the rotary portion 330″ may rotate the workpiece holder 305″ around an axis of rotation AOR, which in the illustrated example is horizontal and parallel to the $Y_M$ axis of the machine coordinate system, and is perpendicular to the $Z_M$ axis of the machine coordinate system. In the illustrated orientation, the local coordinate system of the workpiece holder 305″ is approximately aligned with the machine coordinate system, although as will be described in more detail below with respect to FIGS. 6B and 6C, rotation of the workpiece holder 305″ from the 0 degree orientation illustrated in FIG. 5 by the rotary portion 330″ will result in the local coordinate system (e.g., of the workpiece holder 305″) being rotated relative to the machine coordinate system.

FIGS. 6A-6C are diagrams illustrating a workpiece holder 305 in different orientations relative to a sensing configuration 290. As will be described in more detail below with respect to FIG. 6A, in various implementations, with the workpiece WP held in the workpiece holder 305, and with the workpiece holder 305 in a first orientation (e.g., relative to the sensing configuration 290 and/or relative to one or more additional portions of the metrology system 10), a first position/location (e.g., a first 3-dimensional position within the machine coordinate system) of each of the reference features REF1, REF2 and REF3 may be measured or otherwise determined through utilization of the sensing configuration 290. For example, the sensing configuration 290 may be operated to obtain 3-dimensional reference feature data for determining first 3-dimensional positions of the reference features REF1, REF2 and REF3 while the workpiece holder is in the first orientation (e.g., in which a first side of the workpiece holder 305 and/or workpiece WP faces toward the sensing configuration, which in some implementations may correspond to the first side facing upward, and a second side of the workpiece holder 305 and/or workpiece WP faces away from the sensing configuration, which in some implementations may correspond to the second side facing downward). In various implementations, prior to or after a measuring of the workpiece WP, the determined first 3-dimensional positions of the reference features REF1, REF2 and REF3 may be utilized for establishing a local coordinate system (e.g., such as for the workpiece holder 305 and/or as a part coordinate system for the workpiece WP, etc.).

In the illustrated examples of FIGS. 6A-6C, each of the spherical reference features REF1, REF2 and REF3 comprises a nominally spherical surface, and has a radius RA which corresponds to a distance from a geometric center point CP of each reference feature to surface points on the spherical surface of the reference feature. In various implementations, the 3-dimensional reference feature data may comprise 3-dimensional reference feature surface data corresponding to surface points on the surfaces of the reference features, and for each reference feature in each orientation of the workpiece holder 305, the determining of the 3-dimensional position of the reference feature may comprise determining a 3-dimensional position of a center point CP of the reference feature, based at least in part on the 3-dimensional reference feature surface data.

As described above, in various implementations, the sensing configuration 290 may comprise a probe or other sensor (e.g., a chromatic range sensor probe 290', a vision probe 290'', etc.) which may have an optical axis OA directed toward the workpiece WP. In various implementations, the sensing configuration 290 and/or the metrology system 10 may also or alternatively include a contact sensor (e.g., a contact probe 290'''), with a physical stylus with a contact point at one end (e.g., which may extend in the direction/orientation of the axis OA illustrated in FIGS. 6A-6C), which is utilized to contact the workpiece WP and reference features for determining data/measurements.

As illustrated in FIG. 6A, the workpiece WP may have a first surface WPS1 on a first side WPFS of the workpiece, and may have a second workpiece surface WPS2 on a second side WPSS of the workpiece. In various implementations, the first side WPFS and second side WPSS of the workpiece WP may correspond to front and back sides of the workpiece WP, respectively, and corresponding first and second 3-dimensional surface data may be for front and back surfaces of the workpiece WP (e.g., corresponding to the first surface WPS1 and the second surface WPS2), respectively. As noted above, for various applications it may be desirable to be able to measure both the first side WPFS and the second side WPSS of the workpiece WP, and to combine the corresponding measurement data (e.g., as part of a 3-dimensional representation of the workpiece WP). Operations for such measurements and combinations (e.g., utilizing the workpiece holder 305) will be described in more detail below.

In FIG. 6A, a number of example surface points SP1-SP5 are illustrated on the first workpiece surface WPS1. Similarly, a number of example surface points SP6-SP8 are illustrated on the second workpiece surface WPS2. As will be described in more detail below, when the workpiece holder 305 is in the first orientation illustrated in FIG. 6A, the sensing configuration 290 may be controlled/operated to obtain (e.g., by measuring) first 3-dimensional surface data for the first surface WPS1 on the first side WPFS of the workpiece, wherein the first 3-dimensional surface data may include/indicate 3-dimensional positions of surface points on the first workpiece surface WPS1 (e.g., such as the surface points SP1, SP2, SP3, SP4 and/or SP5). Similarly, when the workpiece holder 305 is in the second orientation illustrated in FIG. 6B, the sensing configuration 290 may be controlled/operated to obtain (e.g., by measuring) second 3-dimensional surface data for the second surface WPS2 on the second side WPSS of the workpiece WP, wherein the second 3-dimensional surface data may include/indicate 3-dimensional positions of surface points on the second workpiece surface WPS2 (e.g., such as the surface points SP6, SP7 and/or SP8).

Similarly, when the workpiece holder 305 is in the third (or alternative first) orientation illustrated in FIG. 6C, the sensing configuration 290 may be controlled/operated to obtain (e.g., by measuring) third (or alternative first) 3-dimensional surface data for the first surface WPS1 on the first side WPFS of the workpiece, wherein the third (or alternative first) 3-dimensional surface data may include/indicate 3-dimensional positions of surface points on the first workpiece surface WPS1 (e.g., such as the surface points SP1, SP2, SP3, SP4 and/or SP5). In regard to the differences between the orientations of FIGS. 6A and 6C, it will be appreciated that the different orientations result in different orientations of the optical axis OA of the sensing configuration 290 relative to certain surface portions and surface points on the first workpiece surface WPS1 and/or other portions of the workpiece. In various implementations, such different orientations may have certain advantages for measuring certain surface points. For example, in some instances sensors such as sensors 290' or 290'' may be able to achieve stronger measurement signals/more accurate measurements when the optical axis OA is closer to orthogonal to the particular surface portion/surface points. As another example, different angles of the optical axis OA may enable measurement of surface points which might otherwise be obscured or otherwise unreachable in other orientations, such as on a side portion of the workpiece WP between the first and second workpiece surfaces that may better presented toward the sensing configuration 290 to be scanned/sensed in the orientation of FIG. 6C as compared to the orientation of FIG. 6A, etc.

In various implementations, the 3-dimensional positions of surface points on the workpiece surfaces and/or reference features may be referenced in terms of a 3-dimensional coordinate system (e.g., a Cartesian coordinate system, a cylindrical coordinate system, etc.) For example, in some implementations the 3-dimensional positions of surface points on the workpiece surfaces and/or reference features may be referenced in terms of X, Y, Z coordinates of the machine coordinate system and/or the local coordinate system. In some implementations, the 3-dimensional positions may initially be determined/represented in terms of coordinates of the machine coordinate system (i.e., in accordance with the sensing operations of the sensing configuration 290), but may then be converted to coordinates in the local coordinate system (e.g., utilizing the relative 3-dimensional positions of the reference features, as described herein).

In implementations utilizing X, Y, Z coordinates, it will be appreciated that the 3-dimensional surface data and 3-dimensional reference feature data may indicate not only the X and Y coordinates of each of the corresponding surface points (e.g., on the workpiece surface or reference feature surface), but also the Z coordinate of each surface point, as determined in accordance with the operations of the particular sensor (e.g., sensor 290', 290'' or 290''') of the sensing configuration 290, as described above. In some implementations, the Z coordinate of each surface point may be referenced as corresponding to a Z-height of the surface point. For example, in one implementation the surface points SP6, SP7 and SP8 may be at a first Z-height (e.g., in the local coordinate system), while the surface points SP1 and SP5 may be at a second Z-height, and the surface points SP2 and SP4 may be at a third Z-height, and the surface point SP3 may be at a fourth Z-height.

In accordance with such determined 3-dimensional positions/coordinates etc. of each surface point, certain features (e.g., dimensions, etc.) of the workpiece WP may be determined. As an example of utilizing the determined 3-dimensional positions of the surface points (i.e., as corresponding to X, Y, Z coordinates of the surface points, and as may correspond to a Z-height of each surface point), for determining a dimension of the workpiece, a difference between the Z coordinates and/or Z-heights of the surface points SP3 and SP7 (e.g., in the local coordinate system) may correspond to a dimension DM1 of the workpiece WP, which in some instances may represent a thickness of a thickest portion of the workpiece WP, as may correspond to a distance between a portion of the first workpiece surface WPS1 and a portion of the second workpiece surface WPS2. In various implementations, the dimension DM1 may represent/be determined in accordance with a distance between the surface points SP3 and SP7 (e.g., for which in some instances, as a simplified example, the surface points SP3 and SP7 may have the same X and Y coordinates, such as in the local coordinate system and/or for which the difference between the Z coordinates/Z-heights may correspond to the dimension DM1, such as DM1=(Z-height of SP3)−(Z-height of SP7)). It will be appreciated that such differences between 3-dimensional positions (e.g., as represented by coordinates) of other surface points of the workpiece WP may also be utilized to determine additional dimensions of the workpiece WP.

In various implementations, the first orientation of the workpiece holder 305 as illustrated in FIG. 6A may be an initial/starting orientation and/or may otherwise correspond to a rotational orientation (e.g., according to a rotation by the rotary portion 330) of 0 degrees. The second orientation of the workpiece holder 305 as illustrated in FIG. 6B may correspond to a rotational orientation (e.g., according to a rotation by the rotary portion 330) of 180 degrees. In various implementations, an orientation as illustrated in FIG. 6C (e.g., which may be designated as a third orientation, or an alternative first orientation) may correspond to a rotational orientation (e.g., according to a rotation by the rotary portion 330) of either 45 degrees, or 315 degrees (e.g., depending on a rotational orientation being referenced according to either a clockwise or counterclockwise rotation).

In FIG. 6A, the optical axis OA of the sensing configuration 290 is illustrated as being nominally perpendicular to the first side HFS of the workpiece holder 305 and to the first surface WPS1 on the first side WPFS of the workpiece WP (e.g., in various implementations being at least perpendicular/orthogonal to an area of the first workpiece surface WPS1 that includes the surface point SP3, or to a tangent at the surface point SP3 of the curved first workpiece surface WPS1). In FIG. 6B, the optical axis of the sensing configuration 290 is illustrated as being nominally perpendicular to the second side HSS of the workpiece holder 305 and to the second surface WPS2 on the second side WPSS of the workpiece WP.

As will be described in more detail below, various example surface points are also illustrated on the surfaces of the reference features REF1, REF2 and REF3, which, similar to the surface points on the workpiece WP, can be measured/scanned/sensed by moving the sensing configuration 290 to different locations relative to the workpiece holder 305. As will be described in more detail below, each reference feature REF1, REF2 and REF3 has a center point CP (e.g., at a geometric center in the middle of the interior of the reference feature, for which a general representation of each center point CP is illustrated in the end views of FIGS. 6A-6C) and a general representation of a radius RA is illustrated from the center point CP to a surface point on the respective reference feature (e.g., for which the distance from the center point CP to each of the surface points of the reference feature is equal to the radius RA of the reference feature). As will be described in more detail below, in various implementations, by determining the 3-dimensional positions of surface points on the reference features, in combination with the known shapes and/or characteristics of the reference features, the center point CP of each reference feature may be determined, which in various implementations may be representative of/designated as the 3-dimensional position of the reference feature. As shown in FIGS. 6A-6C, a reference plane XYRP (e.g., corresponding to a local coordinate system XY plane) may be defined as including/passing through the three center points CP1, CP2 and CP3 of the three reference features REF1, REF2 and REF3.

As an example, in the first orientation illustrated in FIG. 6A, the sensing configuration 290 may be utilized to measure or otherwise sense the surface points R1P1, R1P2 and/or R1P3 on the reference feature REF1. In various implementations, other surface points may also or alternatively be measured and/or otherwise sensed on the reference feature REF1, which in accordance with the known characteristics/shape (e.g., spherical shape) of the reference feature REF1, may be utilized to determine the 3-dimensional position of the center point CP1, which may be designated as, or otherwise correspond to, the 3-dimensional position of the reference feature REF1. For example, once the 3-dimensional positions of surface points R1P1, R1P2, and/or R1P3 on the reference feature REF1 are determined, the 3-dimensional position of the center point CP1 may be determined at least in part in accordance with the principle that each of the surface points is at the distance RA1 from the center point CP1. As noted above, in various implementations the 3-dimensional positions of the reference feature surface points and the center point may be represented in terms of X, Y, Z coordinates (e.g., of the machine coordinate system and/or the local coordinate system).

In one implementation in which the sensing configuration 290 is maintained in an orientation in which the optical axis OA remains parallel to the Z-axis direction of the machine coordinate system, and may be moved in x and/or y directions but remains at a constant z-height of the machine coordinate system while scanning/measuring the surface points on the reference feature REF1, the surface point R1P2 on the reference feature REF1 may represent a "point of closest approach" to the sensing configuration 290 (e.g., having a Z-height closest to the Z-height of the sensing configuration 290). More specifically, of the surface points that are measured (e.g., the surface points R1P1, R1P2 and/or R1P3, etc.), the surface point R1P2 will be at a 3-dimensional position that is closest to the sensing configuration 290 along the Z-axis direction of the machine coordinate system. In accordance with such features/determinations, the 3-dimensional position of the center point CP1 may correspond to and/or otherwise be determined according to the known distance RA1 from the surface point R1P2, along the Z-axis direction of the machine coordinate system (e.g., for which the 3-dimensional positions of the surface point R1P2 and the center point CP1 may have the same X and Y coordinates, but for which the difference between the Z coordinates may correspond to the distance RA1).

Similarly, the reference feature REF2 includes example surface points R2P1, R2P2 and R2P3, and the reference feature REF3 includes example surface points R3P1, R3P2 and R3P3 which can each be sensed, measured, etc. by the sensing configuration 290 with the workpiece holder 305 in the first orientation as illustrated in FIG. 6A. As described above, the 3-dimensional positions of the example surface points R2P1, R2P2 and/or R2P3, etc. and/or other surface points (e.g., for which the surface point R2P2 may be a "point of closest approach") may be utilized for determining the 3-dimensional position of the center point CP2 of the reference feature REF2, which may correspond to the 3-dimensional position of the reference feature REF2. Similarly, the 3-dimensional positions of the example surface points R3P1, R3P2 and/or R3P3, etc. and/or other surface points (e.g., for which the surface point R3P2 may be a "point of closest approach") may be utilized for determining the 3-dimensional position of the center point CP3 of the reference feature REF3, which may correspond to the 3-dimensional position of the reference feature REF3.

In the example of FIG. 6B, the surface points R1P4, R1P5, R1P6 on the reference feature REF1, the surface points R2P4, R2P5, R2P6 on the reference feature REF2, the surface points R3P4, R3P5, R3P6 on the reference feature REF3, as well as additional or alternative surface points may be sensed/measured on each of reference features, similar to the process described above with respect to FIG. 6A. In various implementations, the surface points R1P5, R2P5 and R3P5 may correspond to the points of closest approach of each of the reference features REF1, REF2 and REF3, relative to the sensing configuration 290 with the optical axis OA parallel to the Z-axis direction of the machine coordinate system and with the sensing configuration 290 moved parallel to an XY plane of the machine coordinate system for sensing the surface points on each of the reference features REF1, REF2 and REF3. As noted above, in various implementations, the determination of the 3-dimensional positions of the surface points (e.g., including surface points R1P5, R2P5 and R3P5 and/or other surface points) may enable a determination of the 3-dimensional positions of the center points CP1, CP2 and CP3, respectively, in accordance with the known characteristics (e.g., including shape and radius RA1, RA2 and RA3) of the reference features REF1, REF2 and REF3, respectively.

Similarly, in the example of FIG. 6C, the surface points R1P1, R1P2, R1P3, R1P4 on the reference feature REF1, the surface points R2P1, R2P2, R2P3, R2P4 on the reference feature REF2, the surface points R3P1, R3P2, R3P3, R3P4 on the reference feature REF3, as well as additional or alternative surface points may be sensed/measured on each of reference features, similar to the process described above with respect to FIG. 6A. In various implementations, the surface points R1P3, R2P3 and R3P3 may correspond to the points of closest approach of each of the reference features REF1, REF2 and REF3, relative to the sensing configuration 290 with the optical axis OA parallel to the Z-axis direction of the machine coordinate system and with the sensing configuration 290 moved parallel to an XY plane of the machine coordinate system for sensing the surface points on each of the reference features REF1, REF2 and REF3. As noted above, in various implementations, the determination of the 3-dimensional positions of the surface points (e.g., including surface points R1P3, R2P3 and R3P3 and/or other surface points) may enable a determination of the 3-dimensional positions of the center points CP1, CP2 and CP3, respectively, in accordance with the known characteristics (e.g., including shape and radius RA1, RA2 and RA3) of the reference features REF1, REF2 and REF3, respectively.

It will be appreciated that the sensing of surface points on the workpiece WP and on the reference features REF1, REF2 and REF3 will be performed in 3-dimensional space, for which surface points may be sensed in addition to or as an alternative to the example surface points illustrated in the simplified example end view representations in FIGS. 6A-6C (e.g., for which such additional surface points may have additional Y-axis direction displacements relative to the example surface points illustrated in the end views of FIGS. 6A-6C, and that such additional surface points may be utilized as part of the processes as described herein with respect to the examples of FIGS. 6A-6C).

It will be appreciated that in various implementations, certain processes (e.g., a rigid body transformation, etc.) may be utilized for combining the first 3-dimensional surface data for the workpiece WP (e.g., as obtained in the first orientation of the workpiece holder 305 as illustrated in FIG. 6A) with the second 3-dimensional surface data for the workpiece WP (e.g., as obtained in the second orientation of the workpiece holder 305 as illustrated in FIG. 6B). More specifically, by regarding the workpiece holder 305 and workpiece WP as a rigid body, in the first orientation as illustrated in FIG. 6A, the 3-dimensional positions of the surface points on the first workpiece surface WPS1 on the first side WPFS of the workpiece (e.g., surface points SP1, SP2, SP3, SP4 and/or SP5, etc.) may each be regarded as being respective distances from the determined 3-dimensional positions of the reference features REF1, REF2 and REF3 (e.g., as corresponding to the 3-dimensional positions of the center points CP1, CP2 and CP3 of the reference features). Similarly, in the second orientation illustrated in FIG. 6B, the 3-dimensional positions of the surface points of the second workpiece surface WPS2 on the second side WPSS of the workpiece (e.g., the surface points SP6, SP7 and/or SP8, etc.) may each be regarded as being respective distances from the determined 3-dimensional positions of the reference features REF1, REF2 and REF3 (e.g., as corresponding to the 3-dimensional positions of the center points CP1, CP2 and CP3 of the reference features).

In accordance with such distances between the respective points, by aligning the relative 3-dimensional positions of the center points CP1, CP2 and CP3 from the processes of FIGS. 6A and 6B in a common coordinate system (e.g., in a common local coordinate system) as part of a rigid body transformation or other process, the first 3-dimensional surface data for the workpiece may be combined with the second 3-dimensional surface data for the workpiece in the common coordinate system (e.g., as part of a 3-dimensional representation of the workpiece WP including the 3-dimensional data for the first workpiece surface WPS1 and the second workpiece surface WPS2). It will be appreciated that as part of such a combination, the 3-dimensional shape of the workpiece WP is maintained as part of the 3-dimensional representation (e.g., including the relative distance and orientation between the first workpiece surface WPS1 and the second workpiece surface WPS2, etc.) It will be appreciated that accurate data/representations regarding such features (e.g., including dimensions, etc.) of the workpiece may be useful/utilized in various implementations (e.g., for determining a dimension of a manufactured workpiece, such as a thickness of a workpiece as corresponding to a distance between a first workpiece surface WPS1 and a second workpiece surface WPS2, etc.)

As described above, the illustrated machine coordinate system (e.g., including the $X_M$, $Y_M$ and $Z_M$ axes) may be in relation to the metrology system 10 and/or the measuring machine 100 of the metrology system. In contrast, a local coordinate system (e.g., including the $X_L$, $Y_L$ and $Z_L$ axes) may be in relation to the workpiece WP and/or the workpiece holder 305, etc. The local coordinate system may rotate with the workpiece holder 305 and workpiece WP. For example, while the local coordinate system is illustrated as being generally aligned with the machine coordinate system in FIG. 6A, in FIG. 6B the local coordinate system has been rotated with the workpiece holder 305 and workpiece WP to be inverted relative to the machine coordinate system (i.e., in accordance with the workpiece holder 305 and workpiece WP having been rotated around the $Y_L$ axis by 180 degrees so as to be inverted relative to the orientation illustrated in FIG. 6A). In FIG. 6C, the local coordinate system is illustrated as being at an angular orientation relative to the machine coordinate system (e.g., in accordance with the rotation of the workpiece holder 305 and workpiece WP around the $Y_L$ axis to an angular orientation of 45 degrees or 315 degrees, for which it is noted in the particular illustrated example that the orientation of the $Y_L$ axis of the local coordinate system is still parallel to the $Y_M$ axis of the machine coordinate system). In various implementations, the workpiece holder 305 may be rotated (e.g., around both the $Y_M$ and $X_M$ axes directions of the machine coordinate system), such that neither the $Y_L$ or $X_L$ axes of the local coordinate system may be parallel with the $Y_M$ or $X_M$ axes of the machine coordinate system after the rotation has been completed.

In the examples of FIGS. 3B, 3C and 6A-6C, the workpiece WP may be a round plano convex lens (e.g., with a 1 inch diameter). While FIGS. 3B, 3C and 6A-6C generally illustrate the workpiece holding portion 305 (e.g., which may include certain workpiece engaging portions, such as workpiece engaging portions CN2A-CN2C) engaging the workpiece WP on or near the second workpiece surface WPS2 (e.g., on a plano or otherwise flat surface) on the second side WPSS of the workpiece, it will be appreciated that non-plano surfaces of workpieces may also be engaged by workpiece engaging portions of workpiece holding portion 320. For example, as described above with respect to FIG. 4B, in various implementations workpiece engaging portions CN2A'-CN2C' may be provided (e.g., which may comprise bellows-style vacuum cups or other elements configured to support and retain or otherwise engage portions of workpieces that may be on non-plano surfaces of the workpieces, such as a curved convex surface, etc.) As further described above, in various implementations, workpiece engaging portions (e.g., pneumatic engaging portions) may comprise integrated pneumatic fittings (e.g., which may facilitate workpiece retention/engaging by use of vacuum suction, etc.) In various implementations, certain different types of pneumatic engaging portions (e.g., pneumatic retention mechanisms) may be utilized (e.g., which may utilize vacuum suction, etc., for which all such pneumatic engaging portions may be operated by air or gas under pressure, in accordance with standard pneumatic principles). In various implementations, the workpiece engaging portions may comprise mechanical clamps or similar mechanisms for engaging/retaining the workpiece WP.

Figure 7:
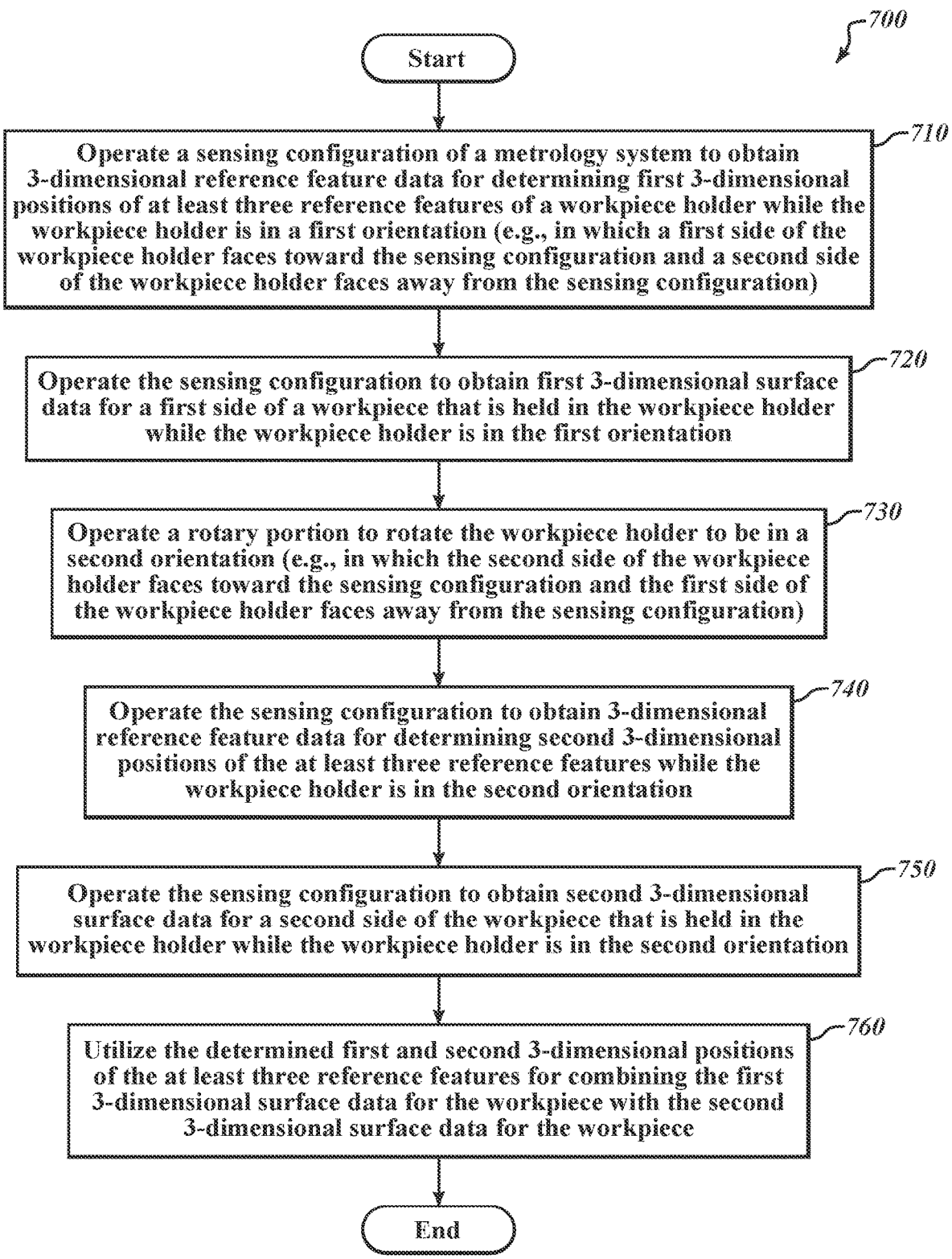
FIG. 7 is a flow diagram illustrating an exemplary implementation of a routine for operating a metrology system for obtaining 3-dimensional surface data for a workpiece in a workpiece holder.

FIG. 7 is a flow diagram illustrating an exemplary implementation of a routine 700 for operating a metrology system for obtaining 3-dimensional surface data for a workpiece that is held in a workpiece holder. In various implementations, the routine 700 may be performed as part of a computer-implemented method, which under control of one or more computing systems configured with executable instructions (e.g., computing systems of the computer 120, motion controller 140, etc.), may perform operations such as those of blocks 710-760, as will be described in more detail below.

As illustrated in FIG. 7, at a block 710, a sensing configuration of a metrology system is operated to obtain 3-dimensional reference feature data for determining first 3-dimensional positions of at least three reference features of a workpiece holder while the workpiece holder is in a first orientation (e.g., in which a first side of the workpiece holder faces toward the sensing configuration and a second side of the workpiece holder faces away from the sensing configuration). At a block 720, the sensing configuration is operated to obtain first 3-dimensional surface data for a first side of a workpiece that is held in the workpiece holder while the workpiece holder is in the first orientation. At a block 730, a rotary portion (e.g., comprising a rotation mechanism) is operated to rotate the workpiece holder to be in a second orientation (e.g., in which the second side of the workpiece holder faces toward the sensing configuration and the first side of the workpiece holder faces away from the sensing configuration).

At a block 740, the sensing configuration is operated to obtain 3-dimensional reference feature data for determining second 3-dimensional positions of the at least three reference features while the workpiece holder is in the second orientation. At a block 750, the sensing configuration is operated to obtain second 3-dimensional surface data for a second side of the workpiece that is held in the workpiece holder while the workpiece holder is in the second orientation. At a block 760, the determined first and second 3-dimensional positions of the at least three reference features are utilized for combining the first 3-dimensional surface data for the workpiece with the second 3-dimensional surface data for the workpiece.

In various implementations, the first 3-dimensional surface data for the workpiece WP may be combined with the second 3-dimensional surface data for the workpiece WP in a common coordinate system (e.g., in a local coordinate system, such as for the workpiece holder 305 and/or workpiece WP). In various implementations, the combining of the first 3-dimensional surface data for the workpiece WP with the second 3-dimensional surface data for the workpiece WP may comprise performing a rigid body transformation or other transformation or process based at least in part on the first and second 3-dimensional positions of the reference features REF1, REF2 and REF3. In various implementations, the combined 3-dimensional surface data (e.g., as represented in X, Y, Z or other coordinates) may be utilized to determine one or more dimensions of the workpiece WP (e.g., as corresponding to distance(s) between the first workpiece surface WPS1 and the second workpiece surface WPS2 and/or between respective surface points thereon, etc.)

It will be appreciated that the utilization of the reference features REF1, REF2 and REF3 as disclosed herein enables the precise orientation and position of the workpiece holder 305 and the workpiece WP to be determined without requiring precise accuracy of other sensors (e.g., of the rotary sensors 341 of the rotary portion 330 of FIG. 2) and without requiring precise knowledge of the location of the workpiece WP relative to the axis of rotation of the rotary portion 330 (e.g., for which the axis of rotation may not be centered through the workpiece and/or workpiece holder, such as illustrated for the axis of rotation AOR of FIG. 5). Such features may reduce the required complexity and expense of a workpiece holding configuration (e.g., in that very high accuracy rotary sensors 341 and/or other sensors may not be required, etc.)

As described above, in various implementations, the determining of the 3-dimensional positions of the reference features REF1, REF2 and REF3 for each orientation of the workpiece holder 305 enables a conversion to be performed for the sensed surface data to be combined in a single 3-dimensional representation/model for the workpiece. For example, based on the determined 3-dimensional positions of the reference features REF1, REF2 and REF3, as described above, a rigid body transformation may be applied to the 3-dimensional surface data for the workpiece (e.g., including first and second 3-dimensional surface data for respective first and second sides of the workpiece) that is obtained for each orientation. In various implementations, as part of the principles for the rigid body transformation, it may be preferable if the workpiece holder and reference features have characteristics for being relatively stable and rigid during measurements (e.g., for which the workpiece being measured may also be relatively stable and rigid as being held by the workpiece holder as part of the rigid body principles).

In various implementations, the reference features REF1, REF2 and/or REF3 may also be utilized to align sensor and/or local coordinate systems for multiple sensors (e.g., such a sensors 290', 290" and/or 290'" of FIG. 2). For example, in regard to a local coordinate system that is established for the measurements as obtained by each sensor (and in accordance with the determined 3-dimensional positions of the reference features as related to each local coordinate system), such local coordinate systems may be aligned (e.g., by aligning the determined 3-dimensional positions of the reference features from each local coordinate system), so that the 3-dimensional surface data for the workpiece as obtained by each sensor can be combined in a common 3-dimensional representation of the workpiece (e.g., as part of a common coordinate system).

It will be appreciated that such capabilities which enable 3-dimensional surface data as obtained by different sensors of a metrology system to be combined (i.e., through utilization of the determined 3-dimensional positions of the reference features of the workpiece holder) may be particularly advantageous for certain applications. For example, in certain implementations such different sensors may be utilized for obtaining 3-dimensional surface data for different portions and/or in relation to different aspects of a workpiece surface (e.g., due to certain sensors having better or otherwise preferred accuracy, sensitivity, ability to reach and/or measure different portions and/or aspects of a certain portion of a workpiece surface), and for which the combined 3-dimensional surface data may have higher accuracy and/or other desirable characteristics relative to 3-dimensional surface data that could be measured/obtained utilizing only one of the sensors.

In various implementations, rather than a single axis of rotation, a rotary portion 330 may be utilized that is configured to have multiple axes of rotation (e.g., a 2 or more axis rotation configuration), so as to be able to achieve additional or alternative orientations. For each additional or alternative orientation, the sensing configuration may be utilized to obtain 3-dimensional reference feature data for determining 3-dimensional positions of the at least three reference features and to obtain 3-dimensional surface data for the workpiece. Correspondingly, the determined 3-dimensional positions of the at least three reference features may be utilized for combining the 3-dimensional surface data with other 3-dimensional surface data obtained in other orientations, utilizing the processes as described above.

In various implementations, two or more workpiece holders (e.g., each holding a different workpiece) may be utilized with a metrology system (e.g., with each workpiece holder having similar characteristics as the workpiece holder 305, such as including at least 3 reference features), wherein for each workpiece holder the sensing configuration 290 may be utilized to obtain 3-dimensional reference feature data for determining 3-dimensional positions of the at least three reference features of the workpiece holder and to obtain 3-dimensional surface data for the workpiece that is held in the respective workpiece holder. In various implementations, such two or more workpiece holders may be rotated by a common rotary portion 330, or alternatively each workpiece holder may be rotated by a corresponding separate rotary portion.

In various implementations, rather than being rotated by a rotary portion, a workpiece holder 305 may be rotated manually by a user. For example, the workpiece holder 305 may initially be placed on a stage (e.g., stage 210) of a metrology system, in a first orientation with a first side of the workpiece holder and workpiece facing upward (e.g., toward the sensing configuration 290). The sensing configuration 290 may then be utilized to obtain 3-dimensional reference feature data for determining first 3-dimensional positions of the at least three reference features of the workpiece holder and to obtain first 3-dimensional surface data for the workpiece that is held in the workpiece holder. Then, a user may manually rotate, flip, or otherwise turn over the workpiece holder 305 and place it on the stage of the metrology system, in a second orientation with a second side of the workpiece holder and workpiece facing upward (e.g., toward the sensing configuration 290), The sensing configuration 290 may then be utilized to obtain 3-dimensional reference feature data for determining second 3-dimensional positions of the at least three reference features of the workpiece holder and to obtain second 3-dimensional surface data for the workpiece that is held in the workpiece holder. The first and second 3-dimensional surface data for the workpiece may then be combined (e.g., as part of a 3-dimensional representation of the workpiece) in accordance with processes as described above.

It will be appreciated that processes such as those disclosed herein do not require the first and second 3-dimensional surface data for the workpiece to overlap. More specifically, some alternative processes may require such overlap in order to properly align or otherwise combine first 3-dimensional surface data with second 3-dimensional surface data (e.g., which may present certain challenges for certain types of metrology systems, sensing configurations and/or workpieces for which it may be difficult or otherwise undesirable to obtain such overlapping surface data, such as with probes with an optical axis oriented along a z-axis direction of a machine coordinate system and/or measuring only the front and back sides of a rotated workpiece, etc.) In accordance with principles disclosed herein, the determined 3-dimensional positions of the reference features REF1, REF2 and REF3 (e.g., for which the reference features may be positioned/located on the workpiece holder 305 and/or otherwise configured to simplify or otherwise enable the measuring of the reference features in multiple orientations of the workpiece holder), may be utilized for combining the first and second 3-dimensional surface data for the workpiece, without requiring the first and second 3-dimensional surface data (e.g., from different sides of the workpiece) to overlap.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A metrology system, comprising:
   a sensing configuration for obtaining 3-dimensional surface data for a workpiece;
   a workpiece holder for holding the workpiece, the workpiece holder comprising:
      a workpiece holding portion comprising a plurality of workpiece engaging portions, wherein each workpiece engaging portion is configured to engage a portion of the workpiece so that the plurality of workpiece engaging portions securely hold the workpiece; and
      at least three reference features that are each configured to be sensed by the sensing configuration both when the workpiece holder is in a first orientation in which a first side of the workpiece holder faces toward the sensing configuration and a second side of the workpiece holder faces away from the sensing configuration, and when the workpiece holder is rotated to be in a second orientation in which the second side of the workpiece holder faces toward the sensing configuration and the first side of the workpiece holder faces away from the sensing configuration;
   a rotary portion for rotating the workpiece holder; and
   a processing device configuration, comprising:
      one or more processors; and
      a memory coupled to the one or more processors and storing program instructions that when executed by the one or more processors cause the one or more processors to at least:
         control the sensing configuration to obtain 3-dimensional reference feature data for determining first 3-dimensional positions of the at least three reference features of the workpiece holder while the workpiece holder is in the first orientation;
         control the sensing configuration to obtain first 3-dimensional surface data for a first side of a workpiece that is held in the workpiece holder while the workpiece holder is in the first orientation;
         control the rotary portion to rotate the workpiece holder from the first orientation to the second orientation;
         control the sensing configuration to obtain 3-dimensional reference feature data for determining second 3-dimensional positions of the at least three reference features while the workpiece holder is in the second orientation;
         control the sensing configuration to obtain second 3-dimensional surface data for a second side of the workpiece that is held in the workpiece holder while the workpiece holder is in the second orientation; and
         utilize the determined first and second 3-dimensional positions of the at least three reference features for combining the first 3-dimensional surface data for the workpiece with the second 3-dimensional surface data for the workpiece.

2. The metrology system of claim 1, wherein the first and second sides of the workpiece correspond to front and back sides of the workpiece, respectively, and the first and second 3-dimensional surface data is for front and back surfaces of the workpiece, respectively.

3. The metrology system of claim 1, wherein the workpiece holder is rotated by approximately 180 degrees from the first orientation to be in the second orientation.

4. The metrology system of claim 1, wherein the rotary portion rotates the workpiece holder around a horizontal axis.

5. The metrology system of claim 1, wherein:
   the first 3-dimensional surface data for the workpiece is combined with the second 3-dimensional surface data for the workpiece in a common 3-dimensional coordinate system; and
   the combining of the first 3-dimensional surface data for the workpiece with the second 3-dimensional surface data for the workpiece comprises performing a rigid body transformation based at least in part on the first and second 3-dimensional positions of the at least three reference features.

6. The metrology system of claim 1, wherein the second 3-dimensional surface data for the workpiece does not overlap with the first 3-dimensional surface data for the workpiece.

7. The metrology system of claim 1, wherein the sensing configuration comprises a non-contact sensor that is utilized for obtaining the 3-dimensional reference feature data and the first and second 3-dimensional surface data.

8. The metrology system of claim 7, wherein the non-contact sensor comprises an optical axis which is oriented along a z-axis direction in a machine coordinate system of the metrology system, and the rotary portion rotates the workpiece holder around a rotation axis that is perpendicular to the z-axis of the machine coordinate system.

9. The metrology system of claim 7, wherein the non-contact sensor is at least one of a chromatic range sensor, a structured light sensor, a laser sensor, an image sensor, or an interferometric sensor.

10. The metrology system of claim 7, further comprising a contact sensor comprising at least one of a scanning probe or touch probe that is also utilized to obtain 3-dimensional reference feature data for determining 3-dimensional positions of the at least three reference features and to obtain 3-dimensional surface data for the workpiece, both when the workpiece holder is in the first orientation and in the second orientation.

11. The metrology system of claim 1, wherein the 3-dimensional reference feature data comprises 3-dimensional reference feature surface data corresponding to surface points on surfaces of the reference features.

12. The metrology system of claim 11, wherein, for each reference feature, a distance between each surface point and a center point of the corresponding reference feature is equal to a radius of the reference feature, and the determining of the 3-dimensional position of the reference feature comprises determining the 3-dimensional position of the center point of the reference feature.

13. The metrology system of claim 12, wherein each of the at least three reference features is a spherical reference feature.

14. The metrology system of claim 1, wherein:
the workpiece holder further comprises a body portion which includes the reference features and which further includes a central aperture, for which the workpiece holding portion has an outer boundary with a size and shape which is configured to fit within the central aperture such that the workpiece holding portion is configured to be secured within the body portion; and
the metrology system further comprises a plurality of additional workpiece holding portions each having an outer boundary with a same shape and size as the outer boundary of the workpiece holding portion such that the workpiece holding portions are interchangeable in that the workpiece holding portions are each configured to be interchanged to fit within the central aperture and be secured within the body portion, wherein each workpiece holding portion comprises a plurality of workpiece engaging portions for engaging a workpiece, and for which each workpiece holding portion of the plurality of workpiece holding portions is configured to hold a workpiece of a different size.

15. A computer-implemented method for operating a metrology system including a sensing configuration for obtaining 3-dimensional surface data for a workpiece that is held in a workpiece holder, the computer-implemented method comprising:
under control of one or more computing systems configured with executable instructions,
operating the sensing configuration of the metrology system to obtain 3-dimensional reference feature data for determining first 3-dimensional positions of at least three reference features of the workpiece holder while the workpiece holder is in a first orientation;
operating the sensing configuration to obtain first 3-dimensional surface data for a first side of a workpiece that is held in the workpiece holder while the workpiece holder is in the first orientation;
operating a rotary portion to rotate the workpiece holder to be in a second orientation;
operating the sensing configuration to obtain 3-dimensional reference feature data for determining second 3-dimensional positions of the at least three reference features while the workpiece holder is in the second orientation;
operating the sensing configuration to obtain second 3-dimensional surface data for a second side of the workpiece that is held in the workpiece holder while the workpiece holder is in the second orientation; and
utilizing the determined first and second 3-dimensional positions of the at least three reference features for combining the first 3-dimensional surface data for the workpiece with the second 3-dimensional surface data for the workpiece.

16. The computer-implemented method of claim 15, wherein the first 3-dimensional surface data for the workpiece is combined with the second 3-dimensional surface data for the workpiece in a common 3-dimensional coordinate system.

17. The computer-implemented method of claim 16, wherein the combining of the first 3-dimensional surface data for the workpiece with the second 3-dimensional surface data for the workpiece comprises performing a rigid body transformation based at least in part on the first and second 3-dimensional positions of the at least three reference features.

18. The computer-implemented method of claim 15, wherein the 3-dimensional reference feature data comprises 3-dimensional reference feature surface data corresponding to surface points on surfaces of the reference features, and for each reference feature in each orientation of the workpiece holder the determining of the 3-dimensional position of the reference feature comprises determining a 3-dimensional position of a center point of the reference feature based at least in part on the 3-dimensional reference feature surface data.

19. A workpiece holding configuration for utilization in a metrology system which includes a sensing configuration that is utilized for obtaining 3-dimensional surface data for a workpiece, the workpiece holding configuration comprising:
a workpiece holder comprising:
a workpiece holding portion comprising a plurality of workpiece engaging portions, wherein each workpiece engaging portion is configured to engage a portion of the workpiece to securely hold the workpiece in the workpiece holder; and
at least three reference features that are each configured to be sensed by the sensing configuration of the metrology system both when the workpiece holder is in a first orientation and when the workpiece holder is rotated to be in a second orientation, wherein:
in the first orientation, the sensing of the at least three reference features by the sensing configuration enables first 3-dimensional positions of the at least three reference features to be determined;
in the first orientation, a first side of a workpiece that is held by the workpiece holder is oriented so as to enable the sensing configuration to obtain first 3-dimensional surface data for a first surface on the first side of the workpiece;
in the second orientation, the sensing of the at least three reference features by the sensing configuration enables second 3-dimensional positions of the at least three reference features to be determined;
in the second orientation, a second side of the workpiece that is held by the workpiece holder is oriented so as to enable the sensing configuration to obtain second 3-dimensional surface data for a second surface on the second side of the workpiece; and
the determined first and second 3-dimensional positions of the at least three reference features enables the first 3-dimensional surface data for the workpiece to be combined with the second 3-dimensional surface data for the workpiece; and
a rotary portion configured to rotate the workpiece holder between different orientations, including rotating the workpiece holder from the first orientation to the second orientation.

20. The workpiece holding configuration of claim 19, wherein the at least three reference features are spherical reference features.

21. The workpiece holding configuration of claim 19, wherein the workpiece holder further comprises a body portion which includes the reference features and which further includes a central aperture, for which the workpiece holding portion is configured to be secured within the central aperture.

22. The workpiece holding configuration of claim 21, further comprising a plurality of additional workpiece holding portions that are interchangeable in that the workpiece holding portions are each configured to be interchangeably secured within the central aperture of the workpiece holder, wherein each workpiece holding portion comprises a plurality of workpiece engaging portions for engaging a workpiece, and for which each workpiece holding portion is configured to hold a workpiece of a different size.

23. The workpiece holding configuration of claim 19, wherein the plurality of workpiece engaging portions comprise pneumatic engaging portions which utilize pneumatic features for engaging the workpiece.

24. The workpiece holding configuration of claim 19, wherein the workpiece holder is rotated by approximately 180 degrees from the first orientation to be in the second orientation.

\* \* \* \* \*